(12) United States Patent
Tokuhara et al.

(10) Patent No.: US 7,996,582 B2
(45) Date of Patent: Aug. 9, 2011

(54) INFORMATION PROCESSING APPARATUS, INFORMATION PROCESSING METHOD, AND INFORMATION PROCESSING PROGRAM

(75) Inventors: Kumiko Tokuhara, Tokyo (JP); Toru Sasaki, Tokyo (JP); Akira Tange, Tokyo (JP); Kentaro Nakamura, Kanagawa (JP)

(73) Assignee: Sony Corporation (JP)

( * ) Notice: Subject to any disclaimer, the term of this patent is extended or adjusted under 35 U.S.C. 154(b) by 345 days.

(21) Appl. No.: 12/077,253

(22) Filed: Mar. 18, 2008

(65) Prior Publication Data
US 2008/0244119 A1    Oct. 2, 2008

(30) Foreign Application Priority Data
Mar. 30, 2007    (JP) .............................. P2007-094819

(51) Int. Cl.
*G06F 13/00*    (2006.01)
(52) U.S. Cl. ................ 710/31; 710/29; 710/33; 710/35; 710/38; 710/74
(58) Field of Classification Search .................... 710/29, 710/31, 33, 35, 38, 74
See application file for complete search history.

(56) References Cited

U.S. PATENT DOCUMENTS

| | | | |
|---|---|---|---|
| 7,406,248 B1* | 7/2008 | Rao et al. ...................... | 386/200 |
| 7,475,078 B2* | 1/2009 | Kiilerich et al. ....................... | 1/1 |
| 2002/0167699 A1* | 11/2002 | Verplaetse et al. ............ | 359/158 |
| 2002/0181060 A1* | 12/2002 | Huang ........................... | 359/172 |
| 2004/0199543 A1* | 10/2004 | Braud et al. ............... | 707/104.1 |
| 2005/0149213 A1* | 7/2005 | Guzak et al. ..................... | 700/94 |
| 2005/0283356 A1* | 12/2005 | Wang ................................ | 704/2 |
| 2005/0289235 A1* | 12/2005 | Suematsu et al. ............. | 709/230 |
| 2006/0075065 A1* | 4/2006 | Renkis .......................... | 709/217 |
| 2007/0045415 A1* | 3/2007 | Usui ............................ | 235/435 |
| 2007/0233759 A1* | 10/2007 | Tomlinson et al. ........... | 708/200 |
| 2007/0237128 A1* | 10/2007 | Patel et al. ..................... | 370/351 |
| 2008/0115071 A1* | 5/2008 | Fair .............................. | 715/764 |
| 2008/0198138 A1* | 8/2008 | McFarlane et al. ........... | 345/173 |
| 2008/0256378 A1 | 10/2008 | Guillorit | |
| 2009/0132525 A1* | 5/2009 | Hattori et al. ...................... | 707/5 |
| 2009/0183088 A1* | 7/2009 | Saka ............................ | 715/751 |
| 2010/0138734 A1* | 6/2010 | Braud et al. .................. | 715/227 |

FOREIGN PATENT DOCUMENTS

| | | |
|---|---|---|
| JP | 7-023442 A | 1/1995 |
| JP | 2000-305855 A | 11/2000 |
| JP | 2001-093226 A | 4/2001 |

(Continued)

*Primary Examiner* — Tariq Hafiz
*Assistant Examiner* — Jasjit S Vidwan
(74) *Attorney, Agent, or Firm* — Lerner, David, Littenberg, Krumholz & Mentlik, LLP

(57) ABSTRACT

An information processing apparatus includes a communication unit that transmits/receives data to and from an external device; a detection unit that detects communication connection with the external device by the communication unit; an operation input unit that accepts an operation input; a command allocation unit that, when the detection unit detects communication connection with the external device, allocates a data transmission command with respect to a one-click operation to a symbol corresponding to a data storage place to be displayed on a display unit, which is accepted by the operation input unit; and a control unit that, when the operation input unit accepts the one-click operation to the symbol, in case the data transmission command is allocated with respect to the one-click operation, controls so that the communication unit transmits data stored in the data storage place corresponding to the symbol to the external device.

11 Claims, 18 Drawing Sheets

FOREIGN PATENT DOCUMENTS

| | | |
|---|---|---|
| JP | 2001175624 | 6/2001 |
| JP | 2002-123268 A | 4/2002 |
| JP | 2003-077214 A | 3/2003 |
| JP | 2004-094577 A | 3/2004 |
| JP | 2006-186438 A | 7/2006 |
| JP | 2007-526678 T | 9/2007 |
| WO | 2005-006611 A1 | 1/2005 |
| WO | 2005-073856 A2 | 8/2005 |

* cited by examiner

INFORMATION PROCESSING APPARATUS, INFORMATION PROCESSING METHOD, AND INFORMATION PROCESSING PROGRAM

CROSS-REFERENCE TO RELATED APPLICATIONS

The present application claims priority from Japanese Patent Application No. JP 2007-094819, filed in the Japanese Patent Office on Mar. 30, 2007, the entire content of which is incorporated herein by reference.

BACKGROUND OF THE INVENTION

1. Field of the Invention

This invention relates to an information processing apparatus, an information processing method, and an information processing program which are desirably applied to a case when transmitting/receiving data between apparatuses.

2. Description of the Related Art

There are widely diffused information processing apparatuses (for example, personal computers, audio components, etc.) which store music data ripped from a CD or music data downloaded from a music delivery server in a mass-memory unit such as a hard disc, and make the user listen to music by reading out and reproducing arbitrary music data from the mass-memory unit.

Furthermore, most of those personal computers and audio components of these types can transfer arbitrary music data to an external device (for example, portable audio player) which is connected for communication thereto through an interface such as a USB.

Then, the portable audio player makes the user listen to music, for example, with the player main body taken along by the user, by storing music data transferred from the personal computer or audio component in a storage unit such as a flash memory, and reading out and reproducing arbitrary music data from the storage unit.

On the other hand, when transferring music data from an information processing apparatus such as the personal computer to an external device such as the portable audio player, it is desirable that music data desired by the user be easily transferred to the external device from among music data stored in a mass-memory unit of the information processing apparatus.

Accordingly, there has been suggested an information processing apparatus that, when detecting communication connection with an external device, automatically transfers music data selected based on a predetermined condition from among music data stored in a mass-memory unit to an external device (see, for example, Jpn. Pat. Appln. Laid-Open Publication No. 2001-175624 (FIG. 57)).

SUMMARY OF THE INVENTION

Meanwhile, in the above-described information processing apparatus, since music data is transferred by only connecting an external device thereto through, for example, a communication cable, while music data can be easily transferred, music data which is selected based on a predetermined condition is transferred to the external device. Accordingly, it is difficult to say that music data desired by the user can be transferred to an external device, and, accordingly, it is difficult to easily transfer music data desired by the user to an external device.

In view of the above-identified circumstances, it is therefore desirable to provide an information processing apparatus, an information processing method, and an information processing program which can transfer desired data easily.

According to an embodiment of the present invention, there is provided an information processing apparatus including: a communication unit that transmits/receives data to and from an external device; a detection unit that detects communication connection with the external device by the communication unit; an operation input unit that accepts an operation input; a command allocation unit that, when the detection unit detects communication connection with the external device, allocates a data transmission command with respect to a one-click operation to a symbol corresponding to a data storage place to be displayed on a display unit, which is accepted by the operation input unit; and a control unit that, when the operation input unit accepts the one-click operation to the symbol, in case the data transmission command is allocated with respect to the one-click operation, controls so that the communication unit transmits data stored in the data storage place corresponding to the symbol to the external device.

Accordingly, by only performing a one-click operation to a symbol corresponding to an arbitrary data storage place, the information processing apparatus can transmit data desired by the user which is stored in the arbitrary data storage place to an external device.

According to an embodiment of the present invention, there is also provided an information processing apparatus including: a radio communication unit that transmits/receives data by radio to and from external devices; a detection unit that can transmit/receive data to and from the radio communication unit, and detects the closest external device; an operation input unit that accepts an operation input; a control unit that, in a state in which the external device is detected by the detection unit, when the operation input unit accepts an operation to a symbol corresponding to a data storage place displayed on a display unit, controls so that the radio communication unit transmits data stored in the data storage place corresponding to the symbol to the detected external device.

Accordingly, by only performing an operation to a symbol corresponding to an arbitrary data storage place, the information processing apparatus can transmit data desired by the user which is stored in the arbitrary data storage place to the closest external device by radio.

According to the present invention, it becomes possible to realize an information processing apparatus, an information processing method, and an information processing program which can transfer desired data easily.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, embodiments of the present invention will be described in greater detail by referring to the accompanying drawings.

(1) First Embodiment (1-1) General Outline of the First Embodiment

Firstly, general outline of the first embodiment will be explained. After explaining the general outline, a specific example of the first embodiment will be explained.

Figure 1:
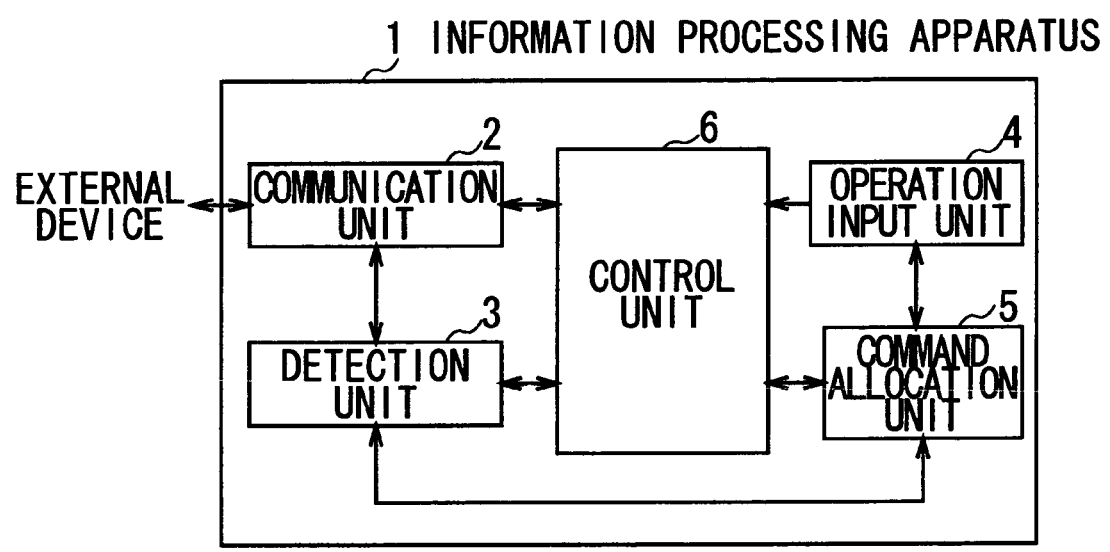
FIG. 1 shows a block diagram indicative of the functional configuration of an information processing apparatus according to the first embodiment.

In FIG. 1, a reference numeral "1" represents a functional block of an information processing apparatus. The information processing apparatus 1 includes a communication unit 2 that transmits/receives data to and from an external device, a detection unit 3 that detects communication connection with the external device by the communication unit 2, an operation input unit 4 that accepts an operation input, a command allocation unit 5 that, when the detection unit 3 detects communication connection with the external device, allocates a data transmission command with respect to a one-click operation to a symbol corresponding to a data storage place to be displayed on a display unit, which is accepted by the operation input unit 4, and a control unit 6 that, when the operation input unit 4 accepts the one-click operation to the symbol, in case the data transmission command is allocated with respect to the one-click operation, controls so that the communication unit 2 transmits data stored in the data storage place corresponding to the symbol to the external device.

Under the above-described configuration, the information processing apparatus 1 can transmit data desired by the user stored in an arbitrary data storage place to the external device by only the one-click operation to the symbol corresponding to the arbitrary data storage place. Thus, it is possible to transfer desired data easily.

Figure 2:
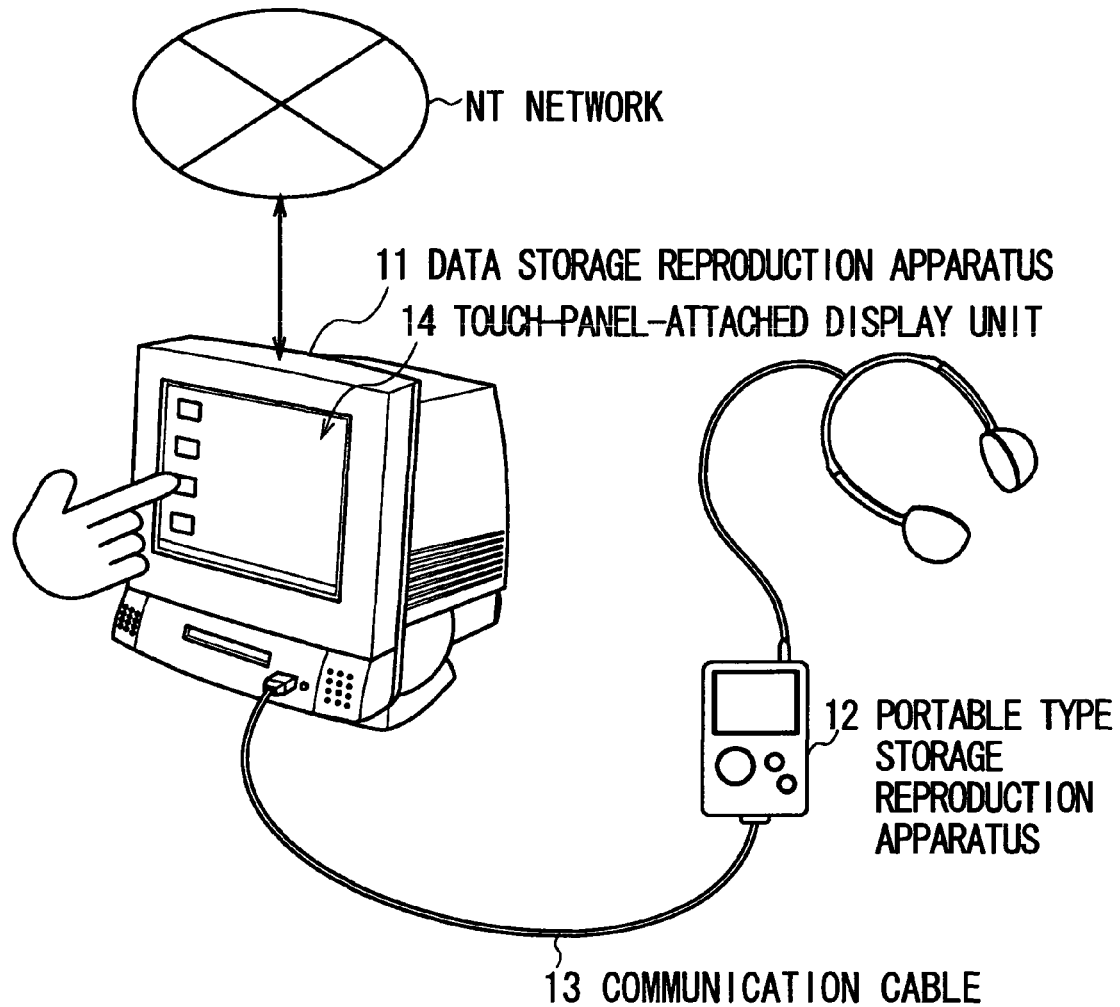
FIG. 2 shows a schematic view indicative of the configuration of a data transfer system according to the first embodiment.

(1-2) Specific Example of the First Embodiment (1-2-1) Configuration of Data Transfer System Next, a specific example of the first embodiment will be explained. In FIG. 2, a reference numeral "10" represents a data transfer system. The data transfer system 10 includes a data storage reproduction apparatus 11 provided with the function of storing and reproducing data (for example, music data), and a data storage reproduction apparatus of portable type (also referred to as portable type storage reproduction apparatus) 12 provided with the function of storing and reproducing music data, and the data storage reproduction apparatus 11 and portable type storage reproduction apparatus 12 are connected for communication with each other through a communication cable 13. The data storage reproduction apparatus 11 of the data transfer system 10 is the specific example of the above-described information processing apparatus 1.

The data storage reproduction apparatus 11 has a display unit provided with a touch panel (also referred to as touch-panel-attached display unit) 14, and when the user touches the screen of the touch-panel-attached display unit 14 to touch the touch panel, this touching operation is accepted as an operation input to be converted to various commands.

Then, the data storage reproduction apparatus 11 stores music data ripped from a CD or music data downloaded from a music delivery server, not shown, on a network NT in a built-in storage unit according to the operation input by the user through the touch-panel-attached display unit 14. Furthermore, the data storage reproduction apparatus 11 reproduces arbitrary music data of music data thus stored in the built-in storage unit according to the operation input by the user through the touch-panel-attached display unit 14.

Furthermore, when it is designated that arbitrary music data of music data stored in the storage unit is transferred to the portable type storage reproduction apparatus 12 by an operation input from the user through the touch-panel-attached display unit 14, accordingly, the data storage reproduction apparatus 11 reads out specified music data from the storage unit, and transmits thus read out music data to the portable type storage reproduction apparatus 12 through the communication cable 13.

On the other hand, the portable type storage reproduction apparatus 12 stores music data transferred from the data storage reproduction apparatus 11 through the communication cable 13 in a built-in storage unit, not shown. Then, when the communication cable 13 is removed and it is designated that arbitrary music data is reproduced by the user with the portable type storage reproduction apparatus 12 taken along by the user, accordingly, the portable type storage reproduction apparatus 12 reads out and reproduces music data from the storage unit.

In this way, in the data transfer system 10, according to the operation input through the touch-panel-attached display unit 14 of the data storage reproduction apparatus 11, the data storage reproduction apparatus 11 transfers arbitrary music data of stored music data to the portable type storage reproduction apparatus 12.

Figure 3:
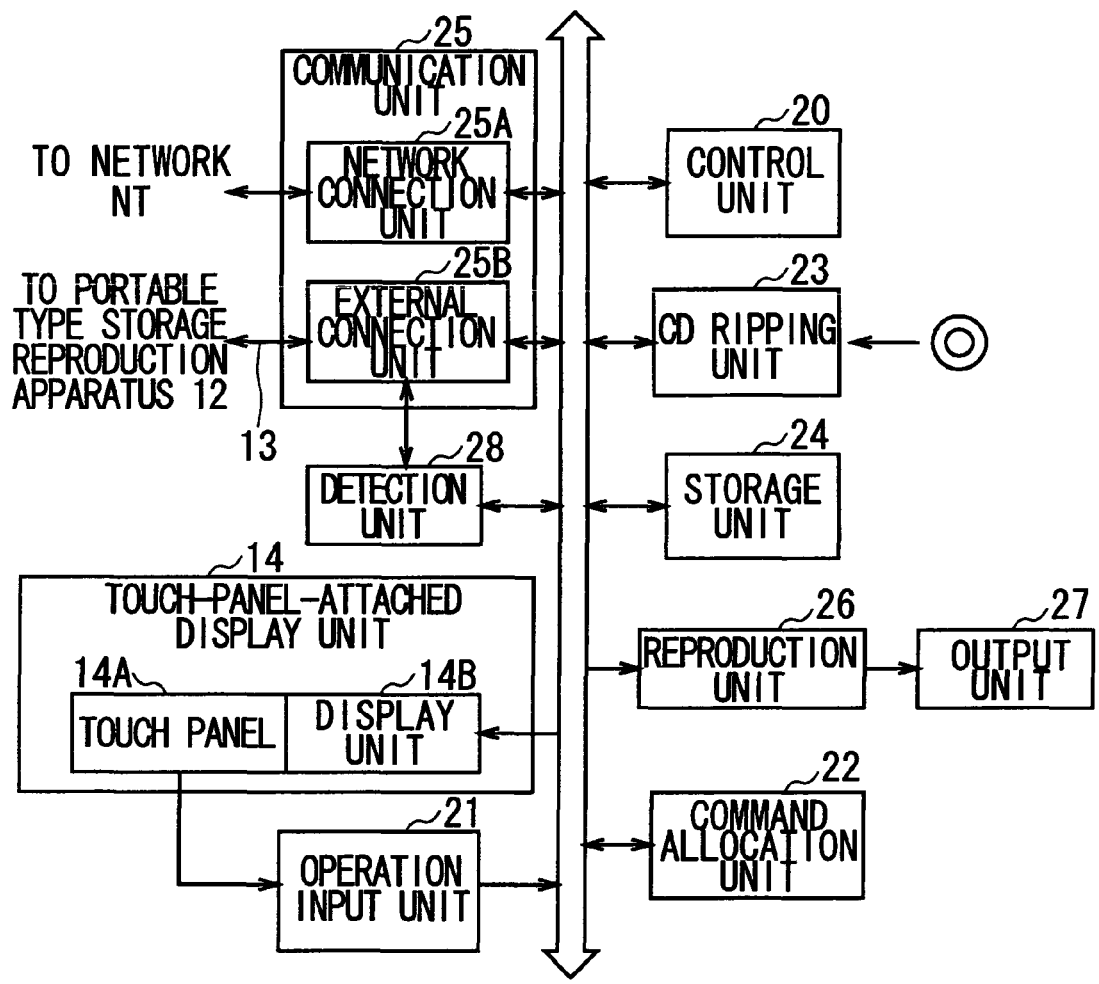
FIG. 3 shows a block diagram indicative of the functional configuration of a data storage reproduction apparatus according to the first embodiment.

(1-2-2) Functional Configuration of Data Storage Reproduction Apparatus and Portable Type Storage Reproduction Apparatus Next, the functional configuration of the data storage reproduction apparatus 11 and the portable type storage reproduction apparatus 12 will be explained. Firstly, referring to FIG. 3, the functional configuration of the data storage reproduction apparatus 11 will be explained. In the data storage reproduction apparatus 11, a control unit 20 totally controls respective units.

Specifically, the control unit 20 accepts an operation input through a touch panel 14A of the touch-panel-attached display unit 14 from an operation input unit 21. For example, in case the operation input accepted from the operation input unit 21 is an operation input to which a command to rip music data from a CD is allocated by a command allocation unit 22, the control unit 20 sends the command to a CD ripping unit 23.

The CD ripping unit 23 reads out music data from an inserted CD, and obtains ripping music data by performing predetermined ripping processing such as conversion processing of data format for the music data, and stores the ripping music data in a storage unit 24. Actually, in the storage unit 24, folders which are data storage places are generated, and, for example, the CD ripping unit 23 stores the ripping music data in the storage unit 24 by storing the ripping music data in a folder specified by the user. This folder is generated in the storage unit 24 or deleted from the storage unit 24 by the control unit 20 based on an operation input by the user.

Furthermore, at this time, based on the TOC (Table of Contents) information of a CD, the CD ripping unit 23 obtains information (also referred to as related information) such as recorded album name, tune name, artist name, genre, reproduction time period, tune ID etc. of the ripping music data from, for example, a related information delivery server, not shown, on a network NT which is connected for communication thereto through a network connection unit 25A of a communication unit 25, and stores the related information in the storage unit 24 together with the ripping music data.

Furthermore, for example, in case the operation input accepted through the operation input unit 21 from the touch panel 14A is an operation input to which a command to download arbitrary music data from a music delivery server on a network NT is allocated, accordingly, the control unit 20 transmits a delivery request for specified music data to a music delivery server, not shown, which is connected for communication thereto through the network connection unit 25A of the communication unit 25. As a result, when music data is transmitted from the music delivery server, the control unit 20 receives the music data from the network connection unit 25A, and stores thus received music data in a folder of the storage unit 24 which is specified by the user. It is assumed that the related information has been attached to the music data which is delivered from the music delivery server in advance.

In this way, the data storage reproduction apparatus 11 stores the music data ripped from the CD and music data downloaded from the music delivery server in the storage unit 24 by storing the music data in a folder specified by the user.

Furthermore, the control unit 20 shifts part or all of the music data thus stored in a folder to another folder or a newly generated folder based on an operation input by the user.

Furthermore, for example, in case the operation input accepted through the operation input unit 21 from the touch panel 14A is an operation input to which a command to reproduce arbitrary music data of music data stored in the storage unit 24 is allocated, accordingly, the control unit 20 reads out specified music data from the storage unit 24, and sends thus read out music data to a reproduction unit 26. The reproduction unit 26 performs a predetermined reproduction processing for thus sent music data to convert the music data to a music signal, and sends the music signal to an output unit 27. As a result, music based on the music signal is output from the output unit 27.

In this way, the data storage reproduction apparatus 11 reproduces music data stored in the storage unit 24.

Furthermore, in case the operation input accepted through the operation input unit 21 from the touch panel 14A is an operation input to which a command to transfer arbitrary music data of music data stored in the storage unit 24 to the portable type storage reproduction apparatus 12 is allocated, accordingly, the control unit 20 reads out specified music data from the storage unit 24, and sends thus read out music data to the portable type storage reproduction apparatus 12 which is connected for communication thereto through the external connection unit 25B of the communication unit 25 and communication cable 13.

In this way, the data storage reproduction apparatus 11 transfers music data stored in the storage unit 24 to the portable type storage reproduction apparatus 12.

The operation input through the touch-panel-attached display unit 14 will be explained for two cases or, a case in which the data storage reproduction apparatus 11 is not connected for communication with the portable type storage reproduction apparatus 12 (also referred to as at the time of non-connection), and a case in which they are connected for communication with each other (also referred to as at the time of connection). Firstly, the operation input through the touch-panel-attached display unit 14 at the time of non-connection will be explained.

When power is on, the control unit 20 of the data storage reproduction apparatus 11 reads out data for Graphical User Interface (GUI) screen from the storage unit 24, and generates GUI screen data based on the data for GUI screen and the folder configuration of the storage unit 24, and sends thus generated GUI screen data to a display unit 14B of the touch-panel-attached display unit 14. The display unit 14B displays a GUI screen Gw shown in FIG. 4 based on thus sent GUI screen data.

Figure 4:
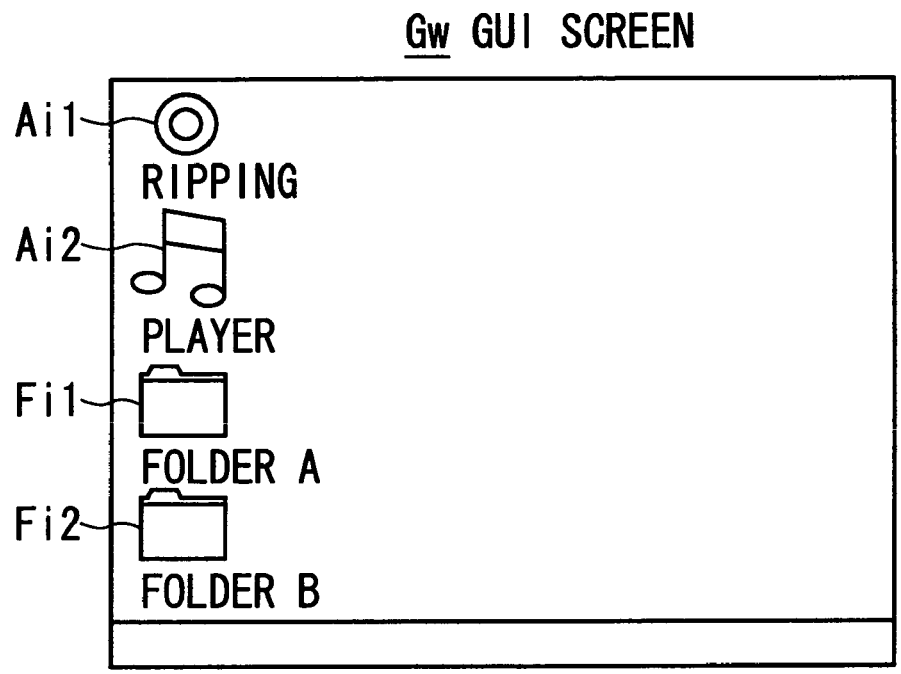
FIG. 4 shows a schematic view indicative of the configuration of a GUI screen at the time of non-connection.

The GUI screen Gw shown in FIG. 4 is a display example at the time of non-connection, and, on the GUI screen Gw in this case, an application icon Ai corresponding to an application stored in the storage unit 24, and a folder icon Fi corresponding to a folder generated in the storage unit 24 are arranged with their respective names attached thereto. Actually, the GUI screen Gw shown in FIG. 4 is an example on which an application icon Ai1 corresponding to a ripping application and its name "ripping", an application icon Ai2 corresponding to a music data reproduction application and its name "player", a folder icon Fi1 corresponding to a folder A and its name "folder A", and a folder icon Fi2 corresponding to a folder B and its name "folder B" are arranged.

In a state in which the GUI screen Gw is displayed on the display unit 14B, when the operation of touching the application icon Ai1 corresponding to the ripping application is performed two times consecutively (also referred to as double-click or two-click) by the user, the touch panel 14A arranged on the display unit 14B sends the operation as an operation input to the operation input unit 21. Then, the operation input unit 21 sends the operation input to the control unit 20.

The control unit 20 recognizes that the operation input is an operation input to which a command to execute an application corresponding to the application icon Ai is allocated by the command allocation unit 22, and, for example, highlights and displays the application icon Ai1 according to the operation input, and, in accordance with a command which is allocated to the operation input, reads out the ripping application from the storage unit 24 to execute thus read out ripping application. In a case in which the application icon Ai2 corresponding to the music data reproduction application is double-clicked, similar processing is performed.

In this way, when the application icon Ai is double-clicked through the touch panel 14A, the data storage reproduction apparatus 11 executes the application corresponding to the application icon Ai.

Figure 5:
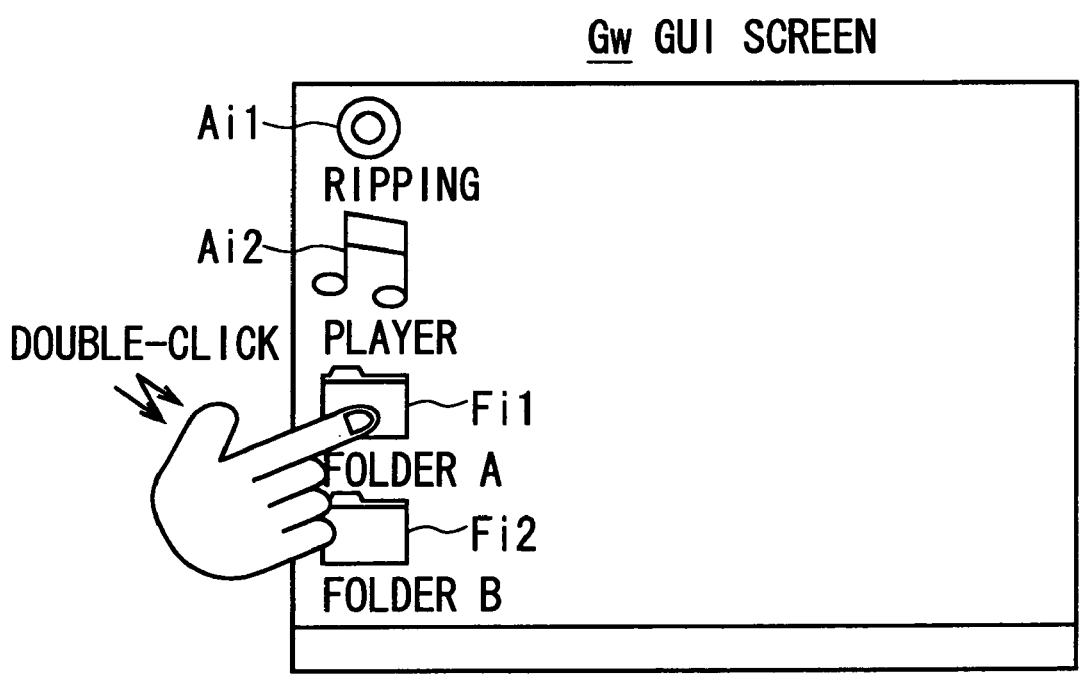
FIG. 5 shows a schematic view to explain the operation of double-clicking a folder icon.

On the other hand, for example, as shown in FIG. 5, when the folder icon Fi1 corresponding to the folder A is double-clicked, the touch panel 14A sends the operation as an operation input to the operation input unit 21. Then, the operation input unit 21 sends the operation input to the control unit 20.

Figure 6:
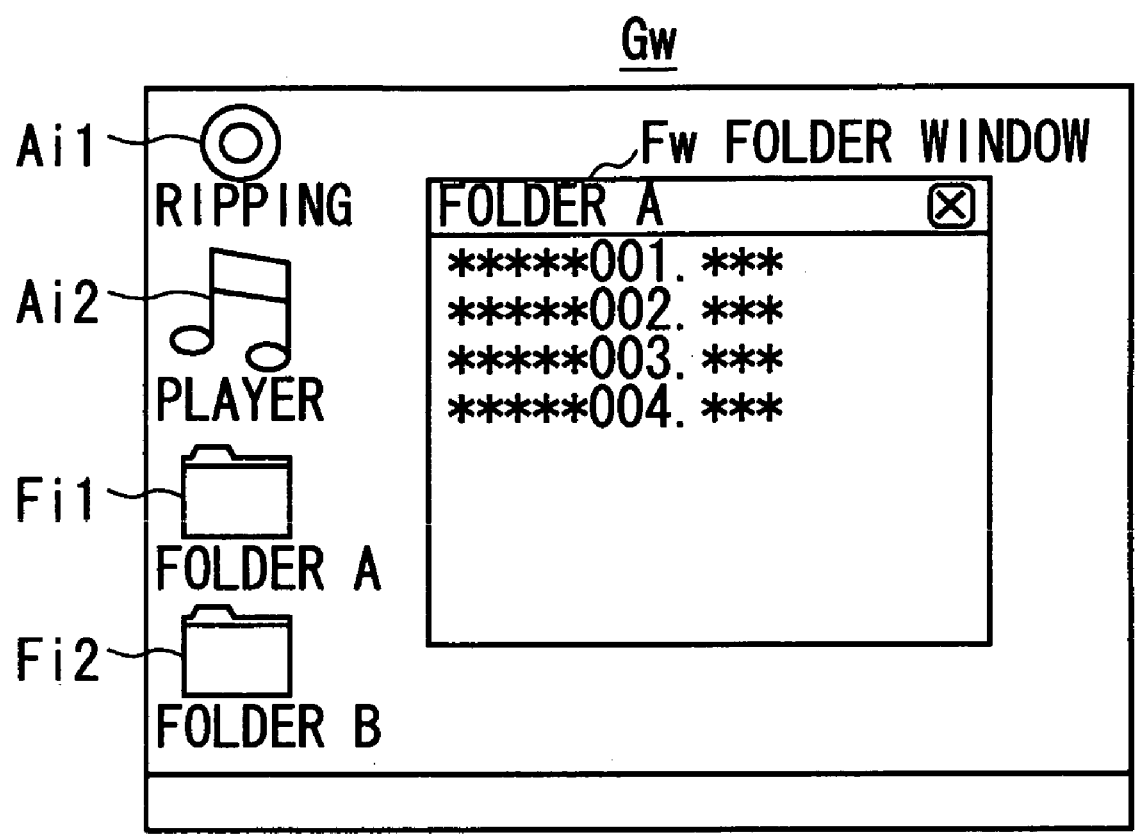
FIG. 6 shows a schematic view indicative of the configuration of a folder window.

The control unit 20 recognizes that the operation input is an operation input to which a command to display the contents of a folder corresponding to the folder icon Fi is allocated by the command allocation unit 22, and, as shown in FIG. 6, for example, highlights and displays the folder icon Fi according to the operation input, and, in accordance with a command which is allocated to the operation input, displays the file names of music data stored in the folder A such that a folder window Fw to be displayed in the form of a list is superimposed on the GUI screen Gw. In a case in which the folder icon Fi2 corresponding to the folder B is double-clicked, similar processing is performed.

The folder window Fw shown in FIG. 6 is an example in which four file names of music data stored in the folder A, or "***001. *", "***002. *", "***003. *", and "***004. *" are displayed in the form of a list.

In this way, when the folder icon Fi is double-clicked through the touch panel 14A, the data storage reproduction apparatus 11 displays the file names of music data stored in a folder corresponding to the folder icon Fi in the form of a list.

Furthermore, for example, when the file name "***001. *" displayed on the folder window Fw is double-clicked, the touch panel 14A sends the operation as an operation input to the operation input unit 21. Then, the operation input unit 21 sends the operation input to the control unit 20. The control unit 20 recognizes that the operation input is an operation input to which a command to reproduce music data corresponding to the file name is allocated by the command allocation unit 22, and, in accordance with the command allocated to the operation input, reads out music data of the file name "***001. *" from the storage unit 24, and sends thus read out music data to the reproduction unit 26 to reproduce the music data.

In this way, when the file name displayed on the folder window Fw is double-clicked through the touch panel 14A, the data storage reproduction apparatus 11 reproduces music data of the file name.

Explanation up to this is the operation input through the touch-panel-attached display unit 14 at the time of non-connection. With respect to the operation of touching the application icon Ai and folder icon Fi only once (also referred to as one-click) at the time of non-connection, the command allocation unit 22 allocates no command. Accordingly, even if the application icon Ai and folder icon Fi are one-clicked at the time of non-connection, the data storage reproduction apparatus 11 performs no processing.

Next, the operation input through the touch-panel-attached display unit 14 at the time of connection will be explained. When a detection unit 28 of the data storage reproduction apparatus 11 detects that the data storage reproduction apparatus 11 is connected for communication with the portable type storage reproduction apparatus 12 through the communication cable 13 from the external connection unit 25B of the communication unit 25, the detection unit 28 notifies the control unit 20 and command allocation unit 22 of this state. Based on the notification, when recognizing that the data storage reproduction apparatus 11 is connected for communication with the portable type storage reproduction apparatus 12, by changing the display figuration of the folder icon Fi arranged on the GUI screen Gw, the control unit 20 notifies the user that the data storage reproduction apparatus 11 is normally connected for communication with the portable type storage reproduction apparatus 12.

Figure 7:
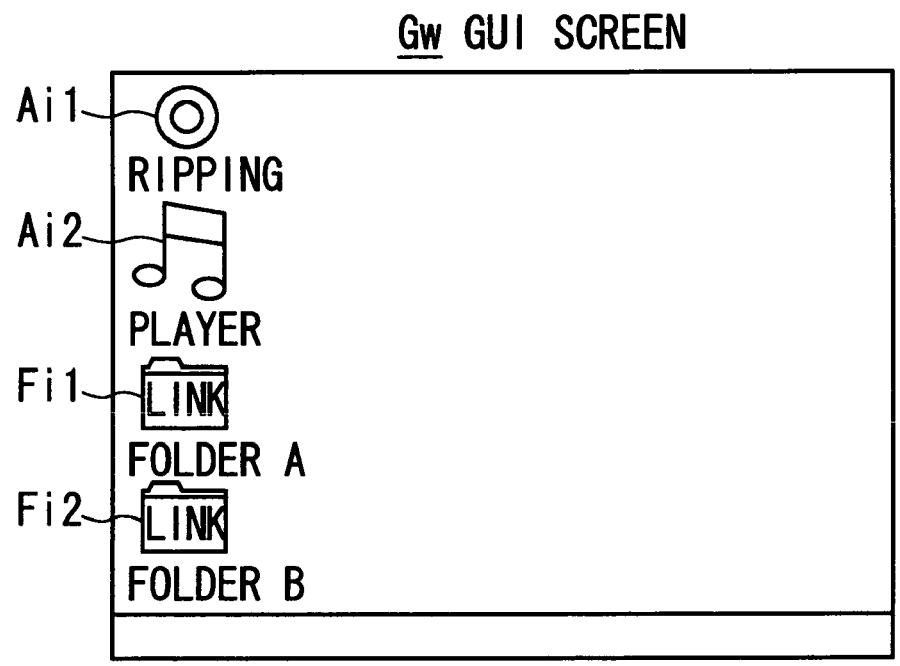
FIG. 7 shows a schematic view indicative of the configuration of a GUI screen at the time of connection.

Specifically, for example, as shown in FIG. 7, by changing the display figuration of the folder icon Fi which simply imitates a plain folder to a display figuration which imitates a folder in which a letter "Link" indicating that the connection for communication is attained is written, the control unit 20 notifies the user that the data storage reproduction apparatus 11 is normally connected for communication with the portable type storage reproduction apparatus 12.

On the other hand, based on the notification from the detection unit 28, when recognizing that the data storage reproduction apparatus 11 is connected for communication with the portable type storage reproduction apparatus 12, with respect to an operation input of one-clicking the folder icon Fi, the command allocation unit 22 allocates a command of transferring music data stored in a folder corresponding to the folder icon Fi to the portable type storage reproduction apparatus 12.

Figure 8:
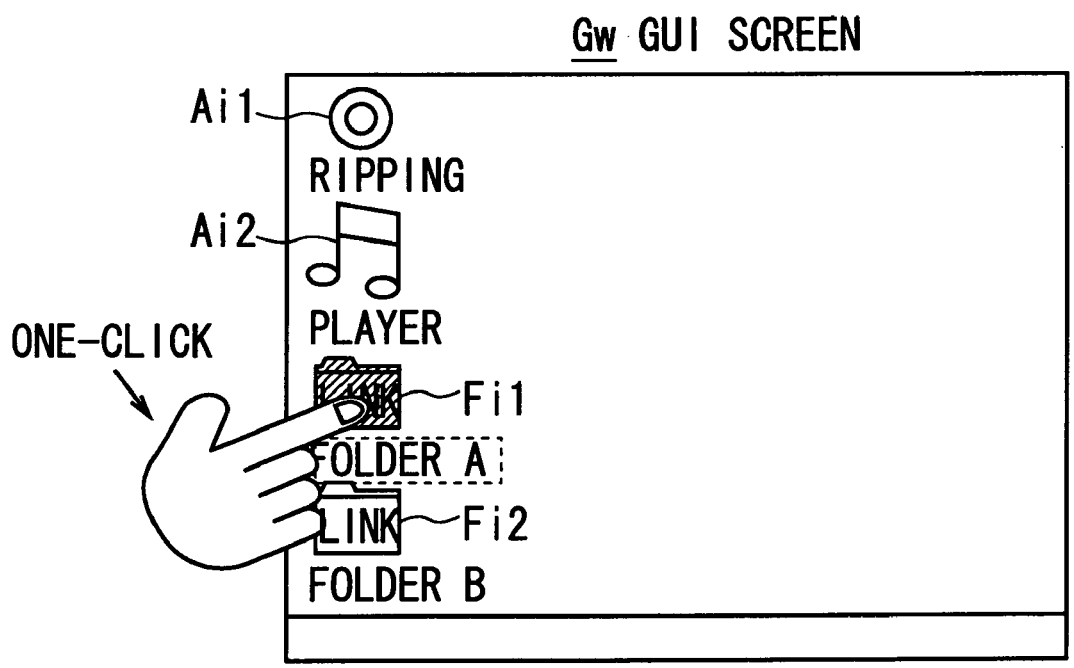
FIG. 8 shows a schematic view to explain the operation of one-clicking a folder icon.

Then, for example, as shown in FIG. 8, when the folder icon Fi1 corresponding to the folder A is one-clicked, the touch panel 14A sends the operation as an operation input to the operation input unit 21. Then, the operation input unit 21 sends the operation input to the control unit 20.

The control unit 20 recognizes that the operation input is an operation input to which a command to transfer music data stored in a folder corresponding to the folder icon Fi to the portable type storage reproduction apparatus 12 is allocated by the command allocation unit 22, and, for example, highlights and displays the folder icon Fi1 according to the operation input, and, in accordance with the command allocated to the operation input, reads out music data stored in the folder A from the storage unit 24, and transmits thus read out music data to the portable type storage reproduction apparatus 12 which is connected for communication thereto through the external connection unit 25B of the communication unit 25 and the communication cable 13. In a case in which the folder icon Fi2 corresponding to the folder B is one-clicked, similar processing is performed. When transferring music data to the portable type storage reproduction apparatus 12, the control unit 20 transfers also the related information.

Explanation up to this is the operation input through the touch-panel-attached display unit 14 at the time of connection. With respect to an operation input of double-clicking the application icon Ai and an operation input of double-clicking the folder icon Fi, the command allocation unit 22 allocates the same command at the time of connection as well as at the time of non-connection.

In this way, when the data storage reproduction apparatus 11 is connected for communication with the portable type storage reproduction apparatus 12, with respect to an operation input of one-clicking the folder icon Fi (that is, one-click operation to the folder icon Fi), a command of transferring music data stored in a folder corresponding to the folder icon Fi to the portable type storage reproduction apparatus 12 is allocated, and, when the folder icon Fi is actually one-clicked, music data stored in a folder corresponding to the folder icon Fi is transmitted to the portable type storage reproduction apparatus 12.

Under this configuration, by only making the user one-click the folder icon Fi corresponding to a folder which stores music data desired to be transferred to the portable type storage reproduction apparatus 12, the data storage reproduction apparatus 11 can transmit music data (that is, music data which is desired to be transferred to the portable type storage reproduction apparatus 12) stored in the folder to the portable type storage reproduction apparatus 12. Accordingly, employing a simplified operation, music data desired by the user can be transferred to the portable type storage reproduction apparatus 12.

Figure 9:
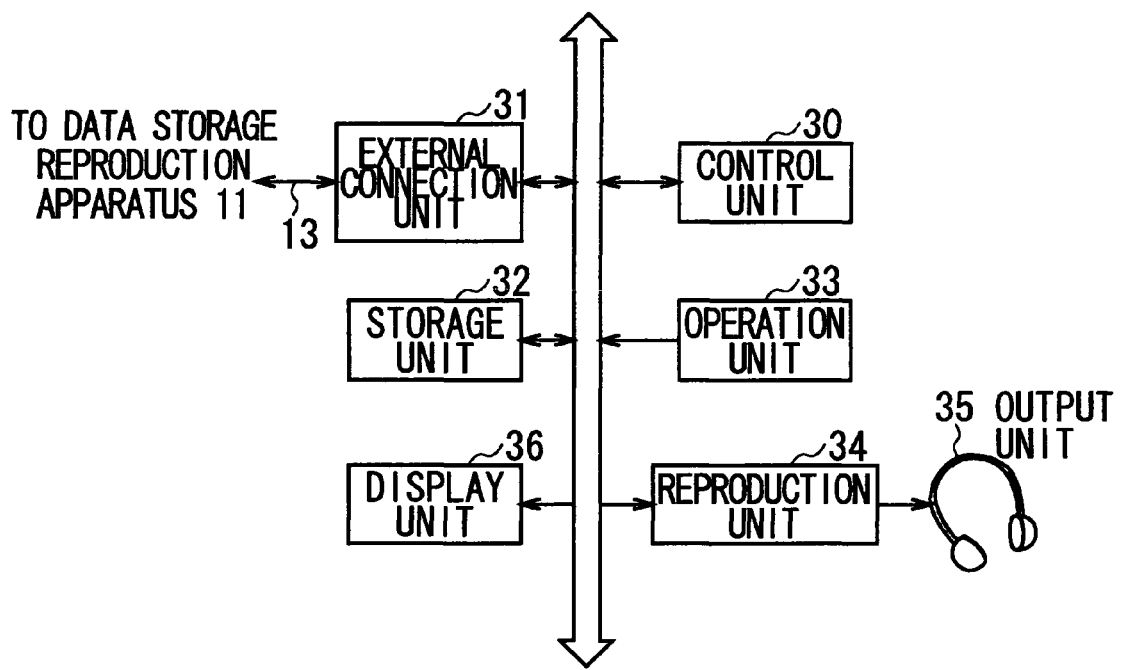
FIG. 9 shows a block diagram indicative of the functional configuration of a portable type storage reproduction apparatus according to the first embodiment.

Next, referring to FIG. 9, the functional configuration of the portable type storage reproduction apparatus 12 will be explained. In the portable type storage reproduction apparatus 12, a control unit 30 totally controls respective units. Specifically, the control unit 30 makes an external connection unit 31 receive music data transferred from the data storage reproduction apparatus 11 which is connected for communication through an external connection unit 31 and communication cable 13, and stores thus received music data in a storage unit 32. It is assumes that related information is attached to the music data which is transferred from the data storage reproduction apparatus 11.

Then, when the communication cable 13 is removed from the external connection unit 31, and it is designated by the user that arbitrary music data stored in the storage unit 32 is reproduced through an operation unit 33, accordingly, the control unit 30 reads out specified music data from the storage unit 32 to send thus read out music data to a reproduction unit 34. Furthermore, at this time, the control unit 30 reads out related information of the music data from the storage unit 32 to send thus read out related information to a display unit 36.

The reproduction unit 34 performs predetermined reproduction processing for thus sent music data to convert the music data to a music signal, and sends the music signal to an output unit 35 being an earphone. As a result, music based on the music signal is output from the output unit 35. Furthermore, the display unit 36 displays tune name, artist name, reproduction elapse time, etc. corresponding to music data which is being reproduced based on the sent related information.

In this way, the portable type storage reproduction apparatus 12 stores music data transferred from the data storage reproduction apparatus 11, and reproduces the music data as necessary.

(1-2-3) Data Transfer Processing Procedure

Figure 10:
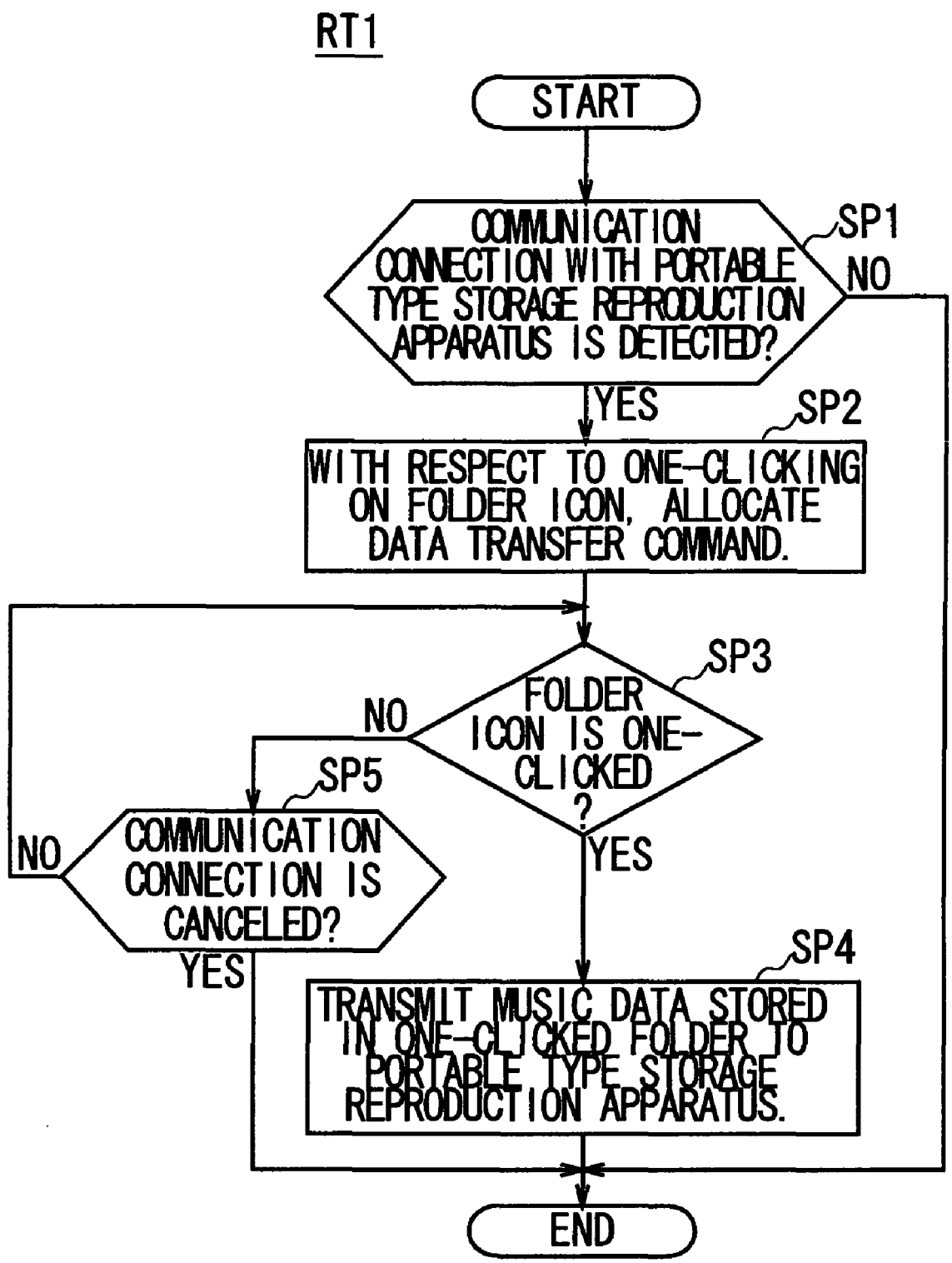
FIG. 10 shows a flowchart indicative of the data transfer processing procedure in the first embodiment.

Next, the processing procedure (also referred to as data transfer processing procedure) when the above-described data storage reproduction apparatus 11 transfers music data to the portable type storage reproduction apparatus 12 will be explained using a flowchart shown in FIG. 10. The data transfer processing procedure is the procedure of processing to be executed mainly by the control unit 20, command allocation unit 22, and detection unit 28 of the data storage reproduction apparatus 11.

For example, when power is on, in step SP1 of the data transfer processing procedure RT1, the detection unit 28 of the data storage reproduction apparatus 11 detects whether or not the data storage reproduction apparatus 11 is connected for communication with the portable type storage reproduction apparatus 12 through the communication cable 13 from the external connection unit 25B. In case the negative result is obtained in step SP1, this represents that the data storage reproduction apparatus 11 is not connected for communication with the portable type storage reproduction apparatus 12, and the detection unit 28 ends the data transfer processing procedure RT1.

On the other hand, in case the positive result is obtained in step SP1, this represents that the data storage reproduction apparatus 11 is connected for communication with the portable type storage reproduction apparatus 12, and the detection unit 28 notifies the command allocation unit 22 of this state.

When receiving the notification that the data storage reproduction apparatus 11 and the portable type storage reproduction apparatus 12 are connected for communication with each other from the detection unit 28, in the following step SP2, with respect to an operation input of one-clicking the folder icon Fi arranged on the GUI screen Gw, the command allocation unit 22 allocates a command (data transfer command) of transferring music data stored in a folder corresponding to the folder icon Fi to the portable type storage reproduction apparatus 12.

When allocating the command is completed by the command allocation unit 22, in the following step SP3, the control unit 20 determines whether or not the folder icon Fi is one-clicked through the touch panel 14A based on an operation input sent from the operation input unit 21.

In case the positive result is obtained in step SP3, this represents that the folder icon Fi is one-clicked by the user, and the control unit 20 goes to step SP4. In step SP4, the control unit 20 reads out music data stored in a folder corresponding to the one-clicked folder icon Fi from the storage unit 24, and transfers thus read out music data to the portable type storage reproduction apparatus 12 from the external connection unit 25B, ending the data transfer processing procedure RT1.

On the other hand, in case the negative result is obtained in step SP3, this represents that the folder icon Fi has not been one-clicked yet, and the control unit 20 goes to step SP5. In step SP5, the control unit 20 determines whether or not notification that the communication connection between the data storage reproduction apparatus 11 and the portable type storage reproduction apparatus 12 is canceled is received from the detection unit 28.

In case the negative result is obtained in step SP5, this represents that the data storage reproduction apparatus 11 and the portable type storage reproduction apparatus 12 are still connected for communication with each other, and then the control unit 20 returns to step SP3 again, and waits for the folder icon Fi to be one-clicked.

On the other hand, in case the positive result is obtained in step SP5, this represents that the communication connection between the data storage reproduction apparatus 11 and the portable type storage reproduction apparatus 12 is canceled, and then the control unit 20 ends the data transfer processing procedure RT1.

In accordance with the data transfer processing procedure RT1, the data storage reproduction apparatus 11 transfers music data to the portable type storage reproduction apparatus 12.

(1-2-4) Operation and Effect in the First Embodiment

In the above-described configuration, the data storage reproduction apparatus 11 stores music data by storing the music data in a folder generated in the storage unit 24. Furthermore, the data storage reproduction apparatus 11 displays the GUI screen Gw on which the folder icon Fi corresponding to the folder generated in the storage unit 24 is arranged on the display unit 14B.

Then, when the data storage reproduction apparatus 11 is connected for communication with the portable type storage reproduction apparatus 12, with respect to an operation input of one-clicking the folder icon Fi arranged on the GUI screen Gw, a data transfer command of transferring music data stored in a folder corresponding to the folder icon Fi to the portable type storage reproduction apparatus 12 is allocated, and, when the folder icon Fi is actually one-clicked, music data stored in a folder corresponding to the folder icon Fi is transmitted to the portable type storage reproduction apparatus 12.

In this way, when connected for communication with the portable type storage reproduction apparatus 12, by only making the user one-click the folder icon Fi corresponding to a folder which stores music data desired to be transferred to the portable type storage reproduction apparatus 12, the data storage reproduction apparatus 11 can transmit music data (that is, music data which the user wants to transfer to the portable type storage reproduction apparatus 12) stored in the folder to the portable type storage reproduction apparatus 12.

Furthermore, when connected for communication with the portable type storage reproduction apparatus 12, the data storage reproduction apparatus 11 changes the display figuration of the folder icon Fi arranged on the GUI screen Gw. In this way, using the folder icon Fi, the data storage reproduction apparatus 11 can make the user recognize that the data storage reproduction apparatus 11 is normally connected for communication with the portable type storage reproduction apparatus 12.

Furthermore, only when connected for communication with the portable type storage reproduction apparatus 12, with respect to an operation input of one-clicking the folder icon Fi, the data storage reproduction apparatus 11 allocates a data transfer command. Accordingly, it becomes possible to prevent, when the data storage reproduction apparatus 11 is not connected for communication with the portable type storage reproduction apparatus 12, wrongly accepting an operation input of transferring music data to the portable type storage reproduction apparatus 12, or wrongly executing the processing of transferring music data to the portable type storage reproduction apparatus 12.

Under this configuration, when the data storage reproduction apparatus 11 is connected for communication with the portable type storage reproduction apparatus 12, with respect to an operation input of one-clicking the folder icon Fi, a command of transferring music data stored in a folder corresponding to the folder icon Fi to the portable type storage reproduction apparatus 12 is allocated, and, when the folder icon Fi is actually one-clicked, music data stored in a folder corresponding to the folder icon Fi is transmitted to the portable type storage reproduction apparatus 12. In this way, by only making the user one-click the folder icon Fi corresponding to a folder which stores music data desired to be transferred to the portable type storage reproduction apparatus 12, the data storage reproduction apparatus 11 can transmit music data (that is, music data which the user wants to transfer to the portable type storage reproduction apparatus 12) stored in the folder to the portable type storage reproduction apparatus 12. Accordingly, it becomes possible to easily transfer music data desired by the user to the portable type storage reproduction apparatus 12 by employing a simple operation.

(2) Second Embodiment

Next, the second embodiment will be explained. In the second embodiment, when the data storage reproduction apparatus 11 is connected for communication with the portable type storage reproduction apparatus 12, not only a data transfer command is allocated with respect to an operation input of one-clicking the folder icon Fi, but also a command different from that at the time of non-connection is allocated with respect to an operation input of double-clicking the folder icon Fi. Accordingly, in this embodiment, command allocation at the time of connection will be mainly explained. The general outline, system configuration, functional configuration of the data storage reproduction apparatus 11 are similar to those in the first embodiment, for which the first embodiment is referred to.

The configuration itself of the portable type storage reproduction apparatus 12 is similar to that in the first embodiment. On the other hand, as an additional function of the control unit 30, reproduction history of music data is stored in the storage unit 24, and the reproduction history is arbitrarily transmitted (that is, uploaded) to the data storage reproduction apparatus 11 from the external connection unit 31.

Specifically, in the second embodiment, when it is recognized that the data storage reproduction apparatus 11 is connected for communication with the portable type storage reproduction apparatus 12 based on the notification from the detection unit 28, with respect to an operation input of one-clicking the folder icon Fi, the command allocation unit 22 of the data storage reproduction apparatus 11 allocates a command of transferring music data stored in a folder corresponding to the folder icon Fi to the portable type storage reproduction apparatus 12, and, with respect to an operation input of double-clicking the folder icon Fi, a command of displaying the contents of a folder corresponding to the folder icon Fi is switched to a command of receiving reproduction history from the portable type storage reproduction apparatus 12 and storing thus received reproduction history in a folder corresponding to the folder icon Fi.

Then, when the folder icon Fi is actually double-clicked, the control unit 20 of the data storage reproduction apparatus 11 transmits an upload request for reproduction history to the portable type storage reproduction apparatus 12 through the external connection unit 25B. As a result, when reproduction history is uploaded from the portable type storage reproduction apparatus 12, the control unit 20 receives the reproduction history from the external connection unit 25B, and stores thus received reproduction history in a folder corresponding to the folder icon Fi which has been double-clicked previously.

(2-1) Data Transfer Processing Procedure in the Second Embodiment

Figure 11:
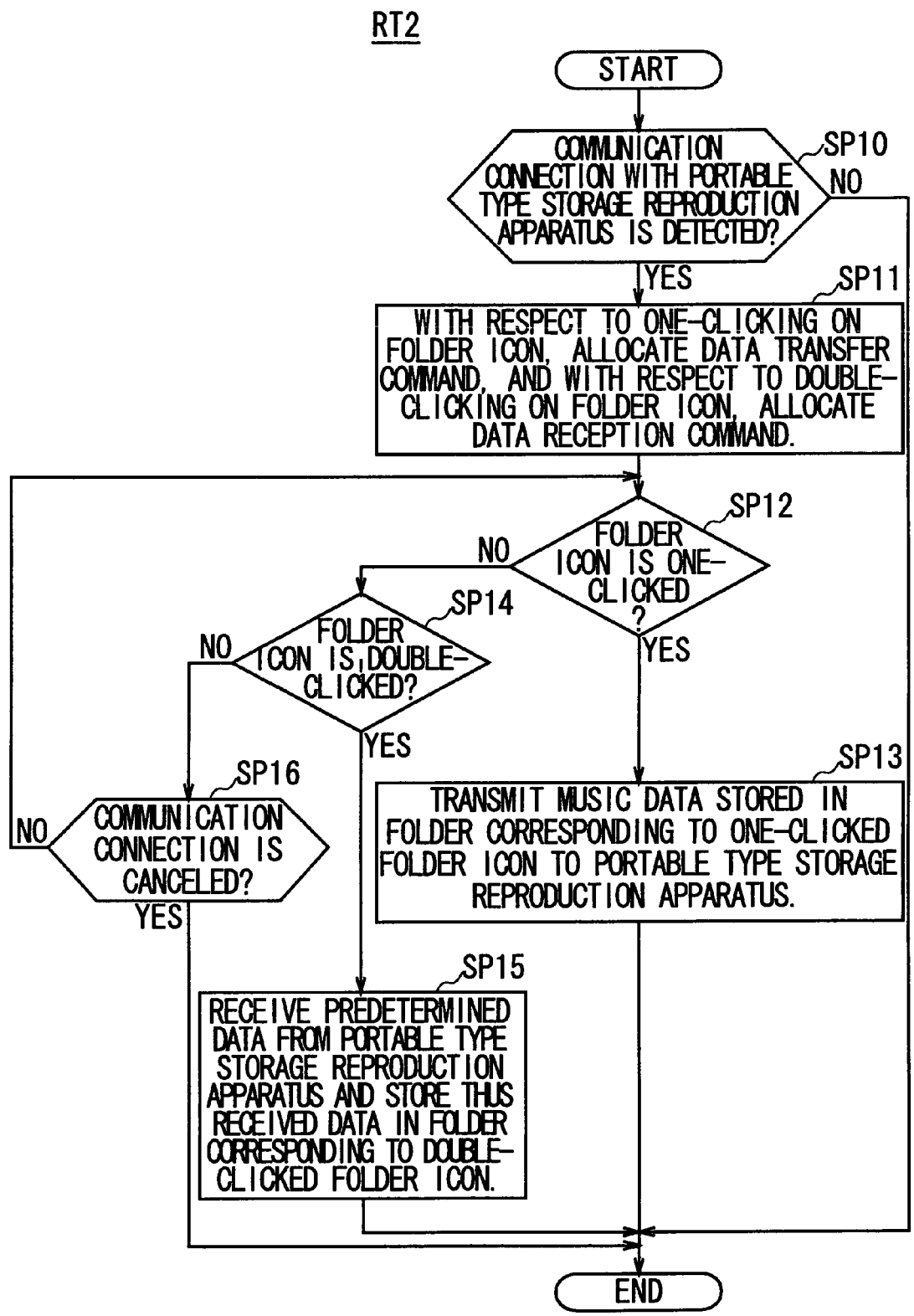
FIG. 11 shows a flowchart indicative of the data transmission/reception processing procedure in the second embodiment.

Next, the processing procedure (also referred to as data transmission/reception processing procedure) when the data storage reproduction apparatus 11 in the second embodiment transfers music data to the portable type storage reproduction apparatus 12, and receives reproduction history from the portable type storage reproduction apparatus 12 will be explained using a flowchart shown in FIG. 11. The data transmission/reception processing procedure is the procedure of processing to be executed mainly by the control unit 20, command allocation unit 22, and detection unit 28 of the data storage reproduction apparatus 11.

For example, when power is on, in step SP10 of the data transfer processing procedure RT2, the detection unit 28 of the data storage reproduction apparatus 11 detects whether or not the data storage reproduction apparatus 11 is connected for communication with the portable type storage reproduction apparatus 12 through the communication cable 13 from the external connection unit 25B. In case the negative result is obtained in step SP10, this represents that the data storage reproduction apparatus 11 and the portable type storage reproduction apparatus 12 are not connected for communication, and the detection unit 28 ends the data transmission/reception processing procedure RT2.

On the other hand, in case the positive result is obtained in step SP10, this represents that the data storage reproduction apparatus 11 and the portable type storage reproduction apparatus 12 are connected for communication with each other, and the detection unit 28 notifies the command allocation unit 22 of this state.

When receiving the notification that the data storage reproduction apparatus 11 and the portable type storage reproduction apparatus 12 are connected for communication with each other from the detection unit 28, in the following step SP11, with respect to an operation input of one-clicking the folder icon Fi arranged on the GUI screen Gw, the command allocation unit 22 allocates a command (data transfer command) of transferring music data stored in a folder corresponding to the folder icon Fi to the portable type storage reproduction apparatus 12, and, with respect to an operation input of double-clicking the folder icon Fi, the command allocation unit 22 allocates a command of receiving reproduction history from the portable type storage reproduction apparatus 12 and stores thus received reproduction history in a folder corresponding to the folder icon Fi.

When allocating the command is completed by the command allocation unit 22, in the following step SP12, the control unit 20 determines whether or not the folder icon Fi is one-clicked through the touch panel 14A based on an operation input sent from the operation input unit 21.

In case the positive result is obtained in step SP12, this represents that the folder icon Fi is one-clicked by the user, and the control unit 20 goes to step SP13. In step SP13, the control unit 20 reads out music data stored in a folder corresponding to the one-clicked folder icon Fi from the storage unit 24, and transfers thus read out music data to the portable type storage reproduction apparatus 12 from the external connection unit 25B, ending the data transmission/reception processing procedure RT2.

On the other hand, in case the negative result is obtained in step SP12, this represents that the folder icon Fi has not been one-clicked yet, and the control unit 20 goes to step SP14. In step SP14, the control unit 20 determines whether or not the folder icon Fi is double-clicked through the touch panel 14A based on an operation input sent from the operation input unit 21.

In case the positive result is obtained in step SP14, this represents that the folder icon Fi is double-clicked by the user, and the control unit 20 goes to step SP15. In step SP15, the control unit 20 receives reproduction history which is uploaded by the portable type storage reproduction apparatus 12 from the external connection unit 25B, and stores thus received reproduction history in a folder corresponding to the double-clicked folder icon Fi, ending the data transmission/reception processing procedure RT2.

In case the negative result is obtained in step SP14, this represents that the folder icon Fi is neither one-clicked nor double-clicked, and the control unit 20 goes to step SP16. In step SP16, the control unit 20 determines whether or not notification that the communication connection between the data storage reproduction apparatus 11 and the portable type storage reproduction apparatus 12 is canceled is received from the detection unit 28.

In case the negative result is obtained in step SP16, this represents that the data storage reproduction apparatus 11 and the portable type storage reproduction apparatus 12 are still connected for communication with each other, and then the control unit 20 returns to step SP12 again, and waits for the folder icon Fi to be one-clicked or double-clicked.

On the other hand, in case the positive result is obtained in step SP16, this represents that the communication connection between the data storage reproduction apparatus 11 and the portable type storage reproduction apparatus 12 is canceled, and then the control unit 20 ends the data transmission/reception processing procedure RT2.

In accordance with the data transmission/reception processing procedure RT2, the data storage reproduction apparatus 11 transfers music data to the portable type storage reproduction apparatus 12, and receives uploaded reproduction history from the portable type storage reproduction apparatus 12.

As has been described above, in the second embodiment, when the data storage reproduction apparatus 11 is connected for communication with the portable type storage reproduction apparatus 12, with respect to an operation input of one-clicking the folder icon Fi, a command of transferring music data stored in a folder corresponding to the folder icon Fi to the portable type storage reproduction apparatus 12 is allocated, and, with respect to an operation input of double-clicking the folder icon Fi, a command of receiving reproduction history from the portable type storage reproduction apparatus 12 and storing thus received reproduction history in a folder corresponding to the folder icon Fi is allocated.

Then, when the data storage reproduction apparatus 11 is connected for communication with the portable type storage reproduction apparatus 12, when the folder icon Fi is actually one-clicked, music data stored in a folder corresponding to the folder icon Fi is transmitted to the portable type storage reproduction apparatus 12, and when the folder icon Fi is double-clicked, reproduction history is received from the portable type storage reproduction apparatus 12 and thus received reproduction history is stored in a folder corresponding to the double-clicked folder icon Fi.

In this way, when the data storage reproduction apparatus 11 of the second embodiment is connected for communication with the portable type storage reproduction apparatus 12, by only one-clicking or double-clicking the folder icon Fi corresponding to a desired folder, music data stored in the folder can be transferred to the portable type storage reproduction apparatus 12, or reproduction history can be received from the portable type storage reproduction apparatus 12 to be stored in the folder. Accordingly, employing a simplified operation, music data desired by the user can be transferred to the portable type storage reproduction apparatus 12, and reproduction history received from the portable type storage reproduction apparatus 12 can be stored in a folder desired by the user.

Furthermore, with respect to the double-click operation to the folder icon Fi, by allocating a command suitable for the communication connection situation with the portable type storage reproduction apparatus 12, employing one operation input method of double-clicking the folder icon Fi, the data storage reproduction apparatus 11 can execute the processing (processing of displaying the contents of a folder, or processing of storing reproduction history received from the portable type storage reproduction apparatus 12 in a folder) suitable for the communication connection situation at that time. In this way, the data storage reproduction apparatus 11 can execute much processing by employing a simple operation that minimizes the operation input method which has to be memorized by the user.

(3) Third Embodiment

Figure 12:
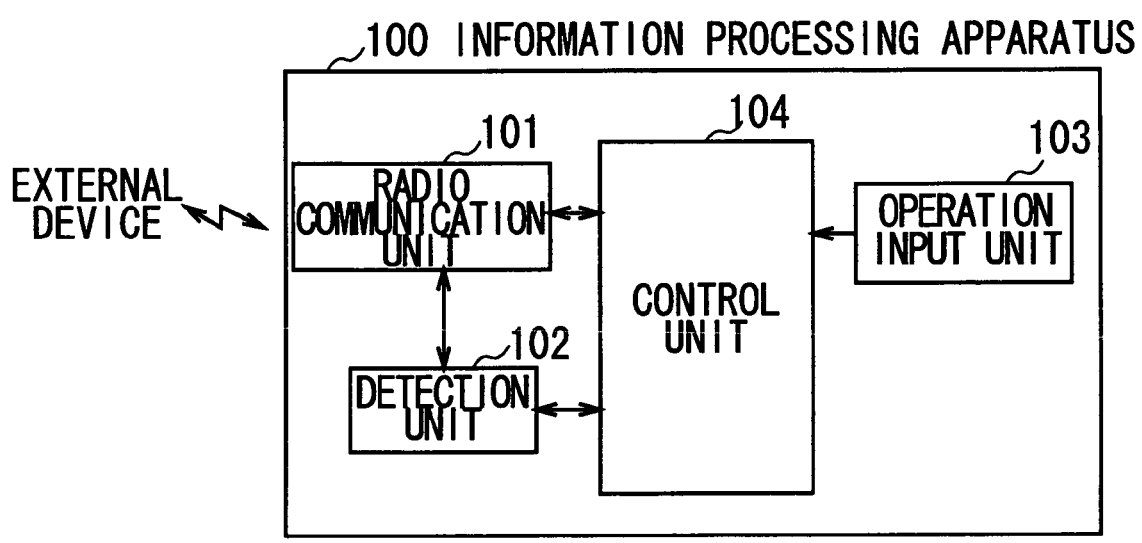
FIG. 12 shows a block diagram indicative of the functional configuration of an information processing apparatus according to the third embodiment.

Next, the third embodiment will be explained. Firstly, general outline of the third embodiment will be explained.
(3-1) General Outline of the Third Embodiment In FIG. 12, a reference numeral "100" represents a functional block of an information processing apparatus. The information processing apparatus 100 includes a radio communication unit 101 that transmits/receives data to and from an external device by radio, a detection unit 102 that can transmit/receive data to and from the radio communication unit 101 and detects the closest external device, an operation input unit 103 that accepts an operation input, and a control unit 104 that, in a state in which an external device is detected by the detection unit 102, when the operation input unit 103 accepts an operation to a symbol corresponding to a data storage place displayed on a display unit, controls so that the radio communication unit 101 transmits data stored in the data storage place corresponding to the symbol to the detected external device.

Figure 13:
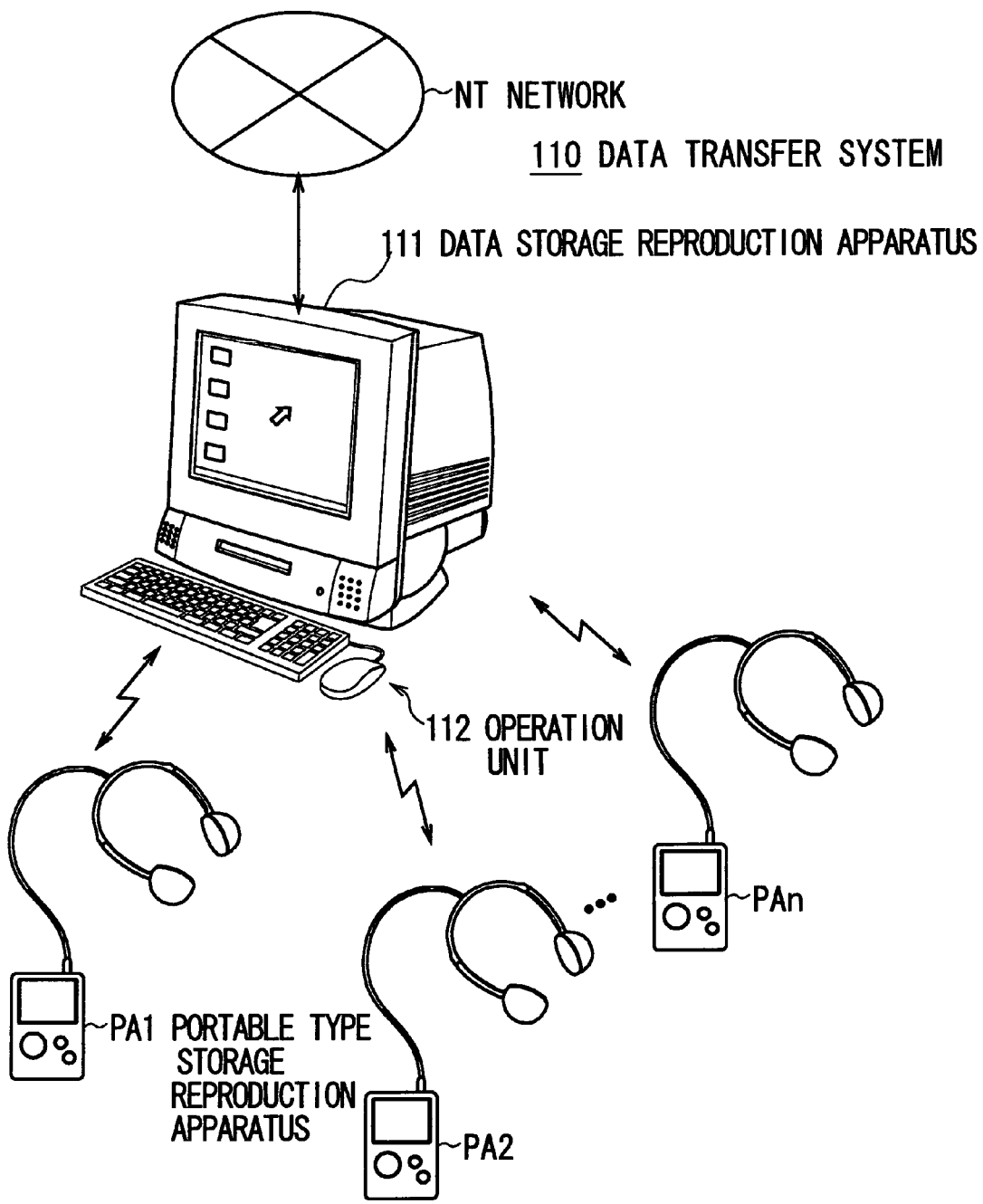
FIG. 13 shows a schematic view indicative of the configuration of a data transfer system according to the third embodiment.

Under the above-described configuration, by only performing an operation to a symbol corresponding to an arbitrary data storage place, the information processing apparatus 100 can transmit data desired by the user stored in the arbitrary data storage place to the closest external device by radio. Thus, it becomes possible to transfer desired data easily.
(3-2) Specific Example of the Third Embodiment
(3-2-1) Configuration of Data Transfer System Next, a specific example of the third embodiment will be explained. In FIG. 13, a reference numeral "110" represents a data transfer system. The data transfer system 110 includes a data storage reproduction apparatus 111 provided with the function of storing and reproducing data (for example, music data), and a plurality of portable type storage reproduction apparatuses PA (PA1, PA2, . . . , PAn) provided with the function of storing and reproducing music data, and these data storage reproduction apparatus 111 and plural portable type storage reproduction apparatuses PA are connected for communication by radio. The data storage reproduction apparatus 111 of the data transfer system 110 is the specific example of the above-described information processing apparatus 100.

The data storage reproduction apparatus 111 stores music data ripped from a CD or music data downloaded from a music delivery server, not shown, on a network NT in a built-in storage unit according to the operation input by the user through an operation unit 112 being a keyboard and a mouse. Furthermore, the data storage reproduction apparatus 111 reproduces arbitrary music data of music data thus stored in the built-in storage unit according to the operation input by the user through the operation unit 112.

Furthermore, when it is designated that arbitrary music data of music data stored in the storage unit is transferred to the portable type storage reproduction apparatus PA by the operation input from the user through the operation unit 112, accordingly, the data storage reproduction apparatus 11 reads out specified music data from the storage unit, and transmits thus read out music data to the predetermined portable type storage reproduction apparatus PA by radio.

On the other hand, the portable type storage reproduction apparatus PA stores music data transferred from the data storage reproduction apparatus 111 by radio in a built-in storage unit, not shown. Then, when it is designated that arbitrary music data is reproduced by the user with the portable type storage reproduction apparatus PA taken along by the user, accordingly, the portable type storage reproduction apparatus PA reads out and reproduces music data from the storage unit.

Figure 14:
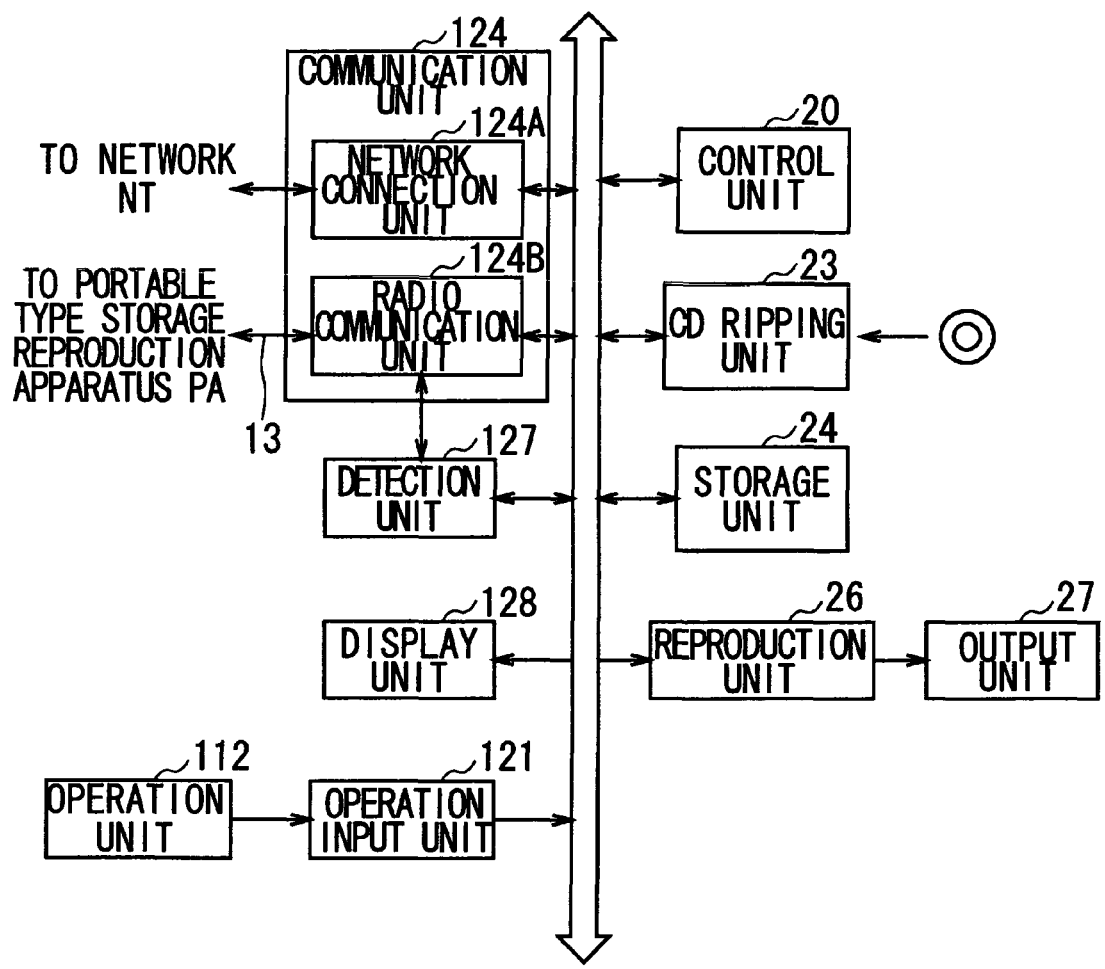
FIG. 14 shows a block diagram indicative of the functional configuration of a data storage reproduction apparatus according to the third embodiment.

In this way, in the data transfer system 110 in the third embodiment, according to the operation input through the operation unit 112 of the data storage reproduction apparatus 111, the data storage reproduction apparatus 111 transfers arbitrary music data of stored music data to the portable type storage reproduction apparatus PA by radio.
(3-2-2) Functional Configuration of Data Storage Reproduction Apparatus and Portable Type Storage Reproduction Apparatus Next, the functional configuration of the data storage reproduction apparatus 111 and the portable type storage reproduction apparatus PA will be explained. Firstly, referring to FIG. 14, the functional configuration of the data storage reproduction apparatus 111 will be explained. In the data storage reproduction apparatus 111, a control unit 120 totally controls respective units.

Specifically, the control unit 120 accepts an operation input through the operation unit 112 from an operation input unit 121. For example, in case the operation input accepted by the operation input unit 121 is an operation input to which a command to rip music data from a CD is allocated, the control unit 20 sends the command to a CD ripping unit 122.

The CD ripping unit 122 reads out music data from an inserted CD, and obtains ripping music data by performing predetermined ripping processing such as conversion processing of data format for the music data, and stores the ripping music data in a storage unit 123. Actually, in the storage unit 123, folders which are logical data storage places are generated, and the CD ripping unit 122 stores the ripping music data in the storage unit 123 by storing the ripping music data in a folder specified by the user, for example. These folders are generated in the storage unit 123 or deleted from the storage unit 123 by the control unit 120 based on the operation input by the user.

Furthermore, at this time, based on the Table of Contents (TOC) information of a CD etc., for example, the CD ripping unit 122 obtains related information such as recorded album name, tune name, artist name, genre, reproduction time period, tune ID, etc. of the ripping music data from a related information delivery server, not shown, on a network NT which is connected for communication through a network connection unit 124A of a communication unit 124, and stores the related information in the storage unit 123 together with the ripping music data.

Furthermore, for example, in case the operation input unit 121 accepts an operation input to which a command to download arbitrary music data from a music delivery server on a network NT is allocated, accordingly, the control unit 120 transmits a delivery request for specified music data to a music delivery server, not shown, which is connected for communication through the network connection unit 124A of the communication unit 124. As a result, when music data is transmitted from the music delivery server, the control unit 120 receives the music data from the network connection unit 124A, and, for example, stores thus received music data in a folder of the storage unit 123 which is specified by the user. It is assumed that related information has been attached to the music data in advance which is delivered from the music delivery server.

In this way, the data storage reproduction apparatus 111 stores the music data ripped from the CD and music data downloaded from the music delivery server in the storage unit 123 by storing the music data in a folder specified by the user.

Furthermore, the control unit 120 shifts part or all of the music data thus stored in a folder to another folder or a newly generated folder based on the operation input by the user.

Furthermore, for example, in case the operation input unit 121 accepts an operation input to which a command to reproduce arbitrary music data of music data stored in the storage unit 123 is allocated, accordingly, the control unit 120 reads out specified music data from the storage unit 123, and sends thus read out music data to a reproduction unit 125. The reproduction unit 125 performs predetermined reproduction processing for thus sent music data to convert the music data to a music signal, and sends the music signal to an output unit 126. As a result, music based on the music signal is output from the output unit 126.

In this way, the data storage reproduction apparatus 111 reproduces music data stored in the storage unit 123.

Furthermore, when the data storage reproduction apparatus 111 is connected for communication with one or more portable type storage reproduction apparatuses PA by radio through a radio communication unit 124B of the communication unit 124, a detection unit 127 detects one portable type storage reproduction apparatus PA closest to the data storage reproduction apparatus 111 from among one or more portable type storage reproduction apparatuses PA which are connected for communication through the radio communication unit 124B.

Actually, when the distance from the portable type storage reproduction apparatus PA is within a predetermined range, the radio communication unit 124B starts communication connection with the portable type storage reproduction apparatus PA automatically. Then, for example, the detection unit 127 obtains intensities of electric waves received from the respective one or more portable type storage reproduction apparatuses PA which are located within a predetermined range to be connected for communication with the radio communication unit 124B for each portable type storage reproduction apparatus PA from the radio communication unit 124B, and detects one portable type storage reproduction apparatus PA corresponding to the highest intensity among the obtained intensities as the portable type storage reproduction apparatus PA closest to the data storage reproduction apparatus 111.

In this way, in a state in which the closest portable type storage reproduction apparatus PA is detected by the detection unit 127 from among the portable type storage reproduction apparatuses PA which are connected for communication by radio through the radio communication unit 124B, when the operation input unit 121 accepts an operation input to which a command to specify an arbitrary folder generated in the storage unit 123 is allocated, accordingly, the control unit 120 reads out music data stored in the specified folder from the storage unit 123, and transmits thus read out music data to the closest portable type storage reproduction apparatus PA by radio through the radio communication unit 124B of the communication unit 124.

In this way, the data storage reproduction apparatus 111 transfers music data stored in the storage unit 123 to the closest portable type storage reproduction apparatus PA by radio among the portable type storage reproduction apparatuses PA which are connected for communication thereto.

Next, the operation input to which a command to specify an arbitrary folder is allocated will be explained. When power is on, the control unit 120 of the data storage reproduction apparatus 111 reads out data for GUI screen from the storage unit 123, and generates GUI screen data based on the data for GUI screen and the folder configuration of the storage unit 123, and sends thus generated GUI screen data to a display unit 128. The display unit 128 displays a GUI screen Gwx shown in FIG. 15 based on thus sent GUI screen data.

Figure 15:
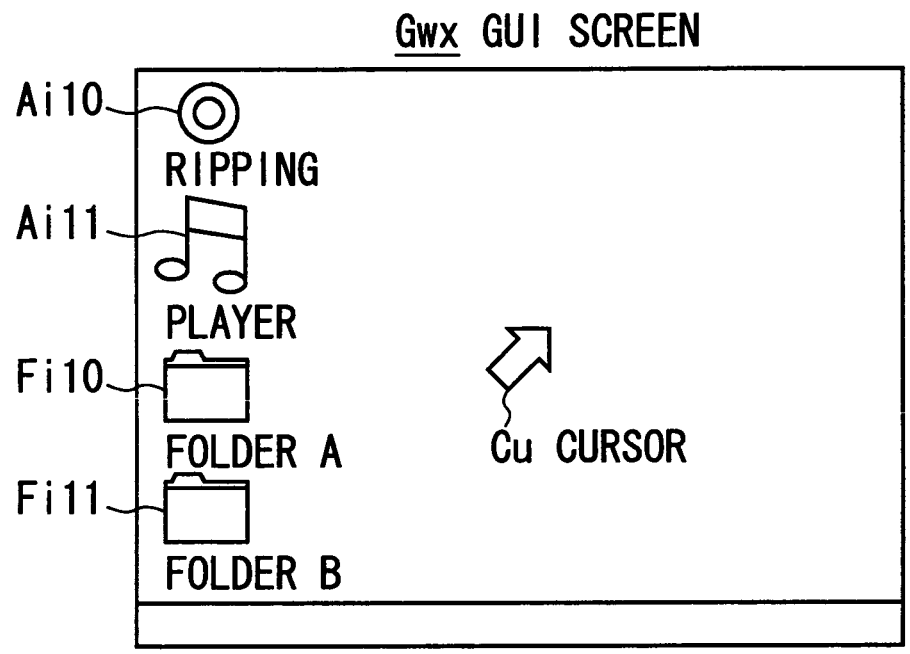
FIG. 15 shows a schematic view indicative of the configuration of a GUI screen.

On the GUI screen Gwx, an application icon Ai corresponding to an application stored in the storage unit 123 and a folder icon Fi corresponding to a folder generated in the storage unit 123 are arranged with their respective names attached thereto. Actually, the GUI screen Gwx shown in FIG. 15 is an example on which an application icon Ai10 corresponding to a ripping application and its name "ripping", an application icon Ai11 corresponding to a music data reproduction application and its name "player", a folder icon Fi10 corresponding to a folder A and its name "folder A", and a folder icon Fi11 corresponding to a folder B and its name "folder B" are arranged.

Furthermore, on the GUI screen Gwx, a cursor Cu in the form of an arrow which can shift on the GUI screen Gwx is displayed through the operation unit 112.

Figure 16:
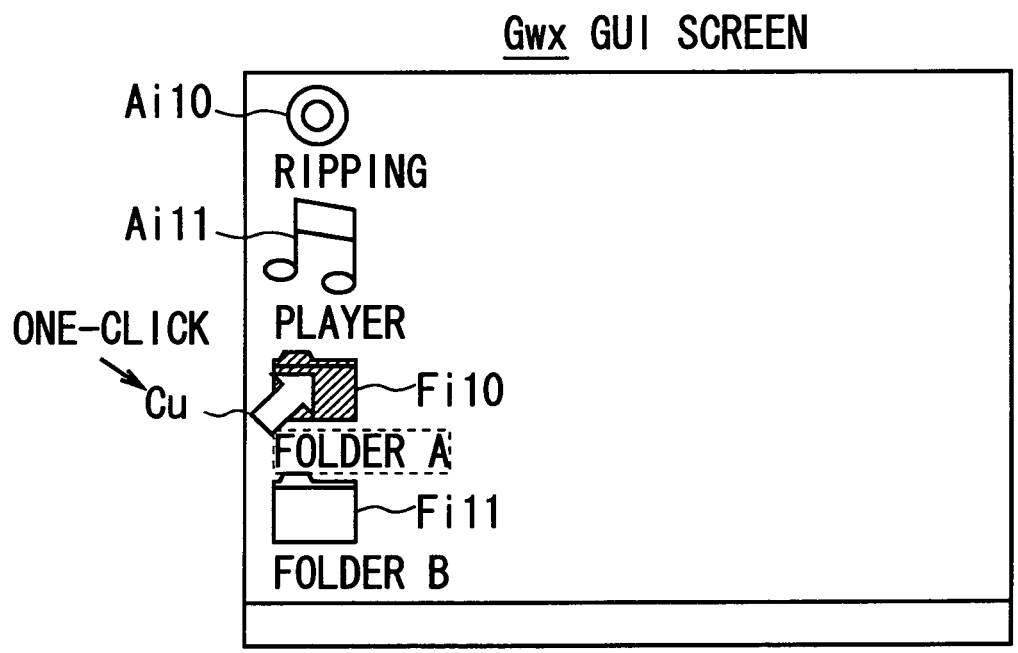
FIG. 16 shows a schematic view to explain a state in which a folder icon is specified.

In a state in which the GUI screen Gwx is displayed on the display unit 128, for example, as shown in FIG. 16, when the operation of shifting the cursor Cu on the folder icon Fi10 corresponding to the folder A through the operation unit 112, and pressing a predetermined button of the operation unit 112 only once (also referred to as one-click) is performed by the user, the operation input unit 121 sends the operation input to the control unit 120.

The control unit 120 recognizes that the operation input is an operation input to which a command to specify a folder is allocated, and, for example, highlights and displays the folder icon Fi10 according to the operation input, and specifies a folder corresponding to the folder icon Fi10. In a case in which the folder icon Fi10 corresponding to the folder B is one-clicked, similar processing is performed.

This operation input of one-clicking the folder icon Fi is an operation input to which a command to specify an arbitrary folder is allocated.

That is, in a state in which the closest portable type storage reproduction apparatus PA is detected by the detection unit 127 from among the portable type storage reproduction apparatuses PA which are connected for communication by radio through the radio communication unit 124B, when the operation input unit 121 accepts an operation input of one-clicking the folder icon Fi (that is, an operation input of specifying a folder corresponding to the folder icon Fi), the control unit 120 reads out music data stored in a folder corresponding to the one-clicked folder icon Fi from the storage unit 123, and transmits thus read out music data to the closest portable type storage reproduction apparatus PA by radio through the radio communication unit 124B of the communication unit 124.

Under the above-described configuration, by only making the user one-click the folder icon Fi corresponding to a folder in which music data desired to be transferred is stored, the data storage reproduction apparatus 111 can transmit music data stored in the folder to the closest portable type storage reproduction apparatus PA by radio.

That is, by only making the user place the desired portable type storage reproduction apparatus PA to a position closest to the data storage reproduction apparatus 111, and one-click the folder icon Fi corresponding to a folder in which music data desired to be transferred to the portable type storage reproduction apparatus PA is stored, the data storage reproduction apparatus 111 can transmit music data stored in the folder (that is, music data which the user wants to transfer to the portable type storage reproduction apparatus PA) to the closest portable type storage reproduction apparatus (that is, the portable type storage reproduction apparatus to which the user wants to transfer music data) PA by radio. Accordingly, it becomes possible to transfer music data desired by the user to the desired portable type storage reproduction apparatus PA by employing a simple operation.

Figure 17:
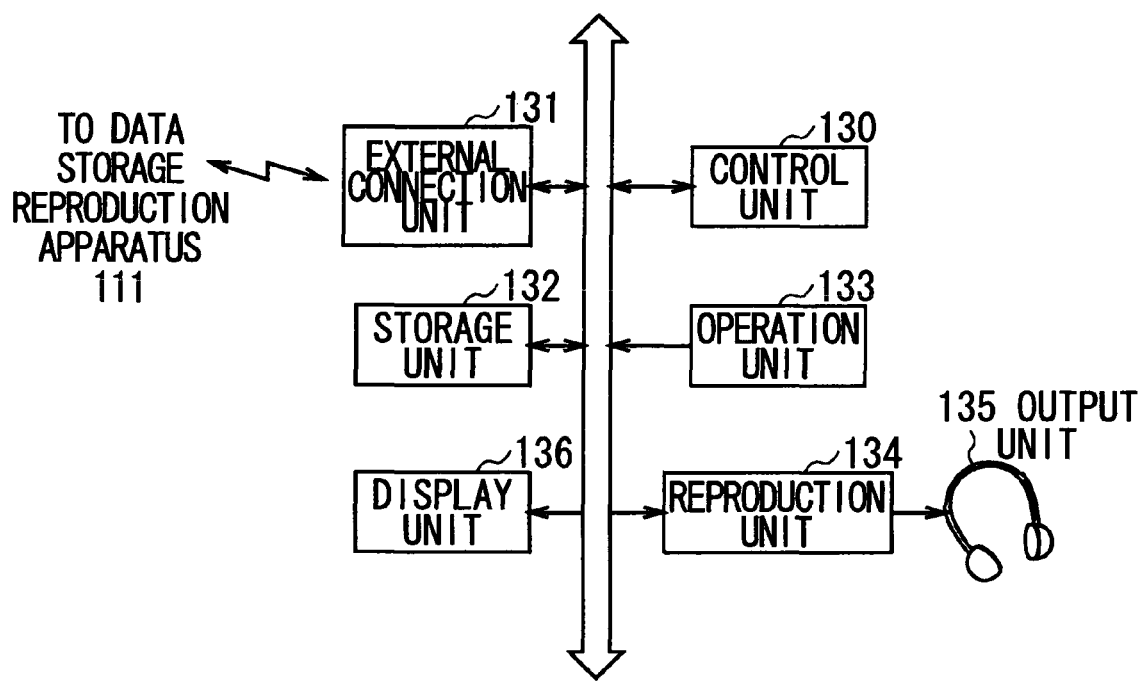
FIG. 17 shows a block diagram indicative of the functional configuration of a portable type storage reproduction apparatus according to the third embodiment.

Next, referring to FIG. 17, the functional configuration of the portable type storage reproduction apparatus PA will be explained. It is assumed that the respective functional configurations of the plural portable type storage reproduction apparatuses PA1, PA2, ..., PAn are similar to each other.

In the portable type storage reproduction apparatus PA, a control unit 130 totally controls respective units. Specifically, the control unit 130 receives music data transferred from the data storage reproduction apparatus 111 which is connected for communication by radio through a radio communication unit 131 from the radio communication unit 131, and stores thus received music data in a storage unit 132. It is assumes that related information is attached to the music data which is transferred from the data storage reproduction apparatus 111.

Then, when it is designated by the user that arbitrary music data stored in the storage unit 132 is reproduced through an operation unit 133, accordingly, the control unit 130 reads out specified music data from the storage unit 132 to send thus read out music data to a reproduction unit 134. Furthermore, at this time, the control unit 130 reads out related information of the music data from the storage unit 132 to send thus read out related information to a display unit 136.

The reproduction unit 134 performs predetermined reproduction processing for thus sent music data to convert the music data to a music signal, and sends the music signal to an output unit 135 being an earphone. As a result, music based on the music signal is output from the output unit 135. Furthermore, the display unit 136 displays tune name, artist name, reproduction elapse time, etc. corresponding to music data which is being reproduced based on the sent related information.

In this way, the portable type storage reproduction apparatus PA stores music data transferred from the data storage reproduction apparatus 111 by radio, and reproduces the music data as necessary.

(3-2-3) Data Transfer Processing Procedure

Figure 18:
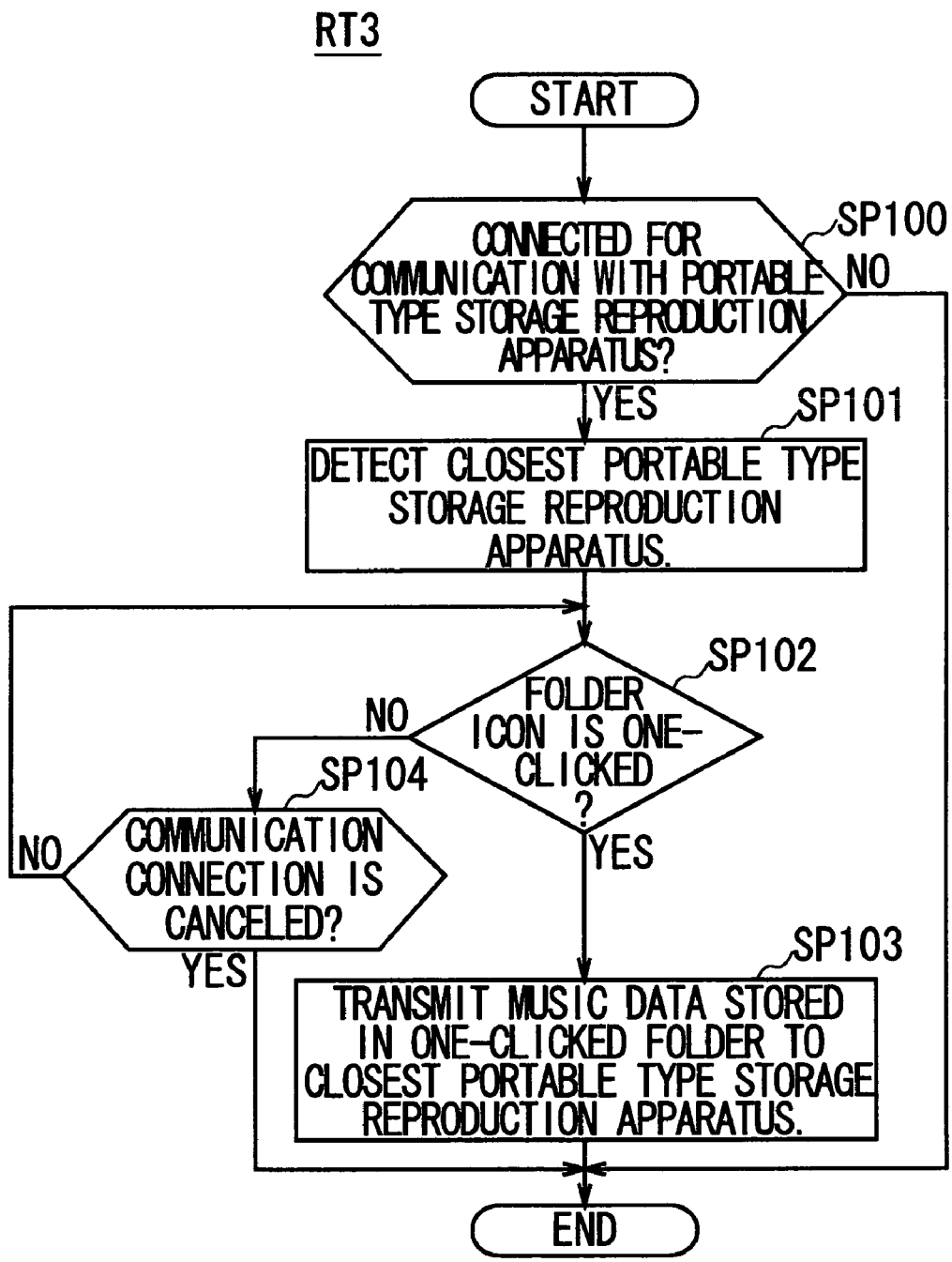
FIG. 18 shows a flowchart indicative of the data transfer processing procedure in the third embodiment.

Next, the data transfer processing procedure when the above-described data storage reproduction apparatus 111 transfers music data to the portable type storage reproduction apparatus PA will be explained using a flowchart shown in FIG. 18. The data transfer processing procedure is the procedure of processing to be executed mainly by the control unit 120, and detection unit 127 of the data storage reproduction apparatus 111.

For example, when power is on, in step SP100 of the data transfer processing procedure RT3, the detection unit 127 of the data storage reproduction apparatus 111 determines whether or not the data storage reproduction apparatus 111 is connected for communication with at least one or more portable type storage reproduction apparatuses PA by radio through the radio communication unit 124B. In case the negative result is obtained in step SP100, this represents that the data storage reproduction apparatus 111 is not connected for communication with any of the portable type storage reproduction apparatuses PA, and the detection unit 127 ends the data transfer processing procedure RT3.

On the other hand, in case the positive result is obtained in step SP100, this represents that the data storage reproduction apparatus 111 is connected for communication with at least one or more portable type storage reproduction apparatuses PA, and the detection unit 127 goes to step SP101.

In step SP101, the detection unit 127 detects one portable type storage reproduction apparatus PA closest to the data storage reproduction apparatus 111 from among one or more portable type storage reproduction apparatuses PA which are connected for communication, and notifies the control unit 130 of this state.

When it is notified which portable type storage reproduction apparatus PA is closest from the detection unit 127, in the following step SP102, the control unit 130 determines whether or not the folder icon Fi arranged on the GUI screen Gwx is one-clicked through the operation unit 112 based on an operation input sent from the operation input unit 121.

In case the positive result is obtained in step SP102, this represents that the folder icon Fi is one-clicked by the user, and the control unit 120 goes to step SP103. In step SP103, the control unit 120 reads out music data stored in a folder corresponding to the one-clicked folder icon Fi from the storage unit 123, and transfers thus read out music data to the closest portable type storage reproduction apparatus PA from the radio communication unit 124B, ending the data transfer processing procedure RT3.

On the other hand, in case the negative result is obtained in step SP102, this represents that the folder icon Fi has not been one-clicked yet, and the control unit 120 goes to step SP104. In step SP104, the control unit 120 determines whether or not notification that the communication connection between the data storage reproduction apparatus 111 and the closest portable type storage reproduction apparatus PA is canceled is received from the detection unit 127.

In case the negative result is obtained in step SP104, this represents that the data storage reproduction apparatus 111 and the closest portable type storage reproduction apparatus PA are still connected for communication, and then the control unit 120 returns to step SP102 again, and waits for the folder icon Fi to be one-clicked.

On the other hand, in case the positive result is obtained in step SP104, this represents that the communication connection between the data storage reproduction apparatus 111 and the closest portable type storage reproduction apparatus PA is canceled, and then the control unit 120 ends the data transfer processing procedure RT3. On the other hand, in case the positive result is obtained in step SP104, without ending the data transfer processing procedure RT3, the control unit 120 may return to step SP100 to determine whether or not the data storage reproduction apparatus 111 is connected for communication with other portable type storage reproduction apparatuses PA.

In accordance with the data transfer processing procedure RT3, the data storage reproduction apparatus 111 transfers music data to the closest portable type storage reproduction apparatus PA by radio.

(3-2-4) Operation and Effect in the Third Embodiment

In the above-described configuration, the data storage reproduction apparatus 111 stores music data by storing the music data in a folder generated in the storage unit 123. Furthermore, the data storage reproduction apparatus 111 displays the GUI screen Gwx on which the folder icon Fi corresponding to a folder generated in the storage unit 123 is arranged on the display unit 128.

Furthermore, when being connected for communication with one or more portable type storage reproduction apparatuses PA by radio, the data storage reproduction apparatus 111 detects the closest portable type storage reproduction apparatus PA from among these one or more portable type storage reproduction apparatuses PA which are connected for communication thereto.

Then, in a state in which the closest portable type storage reproduction apparatus PA is detected from among one or more portable type storage reproduction apparatuses PA which are connected for communication, when the folder icon Fi arranged on the GUI screen Gwx is one-clicked (that is, a folder corresponding to the folder icon Fi is specified), the data storage reproduction apparatus 111 reads out music data stored in a folder corresponding to the folder icon Fi from the storage unit 123, and transmits thus read out music data to the closest portable type storage reproduction apparatus PA by radio through the radio communication unit 124B.

In this way, by only making the user one-click the folder icon Fi corresponding to a folder which stores music data desired to be transferred, the data storage reproduction apparatus 111 can transmit music data stored in the folder to the closest portable type storage reproduction apparatus PA by radio.

Under this configuration, in a state in which the closest portable type storage reproduction apparatus PA is detected from among one or more portable type storage reproduction apparatuses PA which are connected for communication by radio, when the folder icon Fi is one-clicked, the data storage reproduction apparatus 111 transmits music data stored in a folder corresponding to the folder icon Fi to the detected portable type storage reproduction apparatus PA. Accordingly, by only making the user place the desired portable type storage reproduction apparatus PA to a position closest to the data storage reproduction apparatus 111, and one-click the folder icon Fi corresponding to a folder in which music data desired to be transferred to the portable type storage reproduction apparatus PA is stored, music data stored in the folder (that is, music data which the user wants to transfer to the portable type storage reproduction apparatus PA) can be transmitted to the portable type storage reproduction apparatus PA. Accordingly, it becomes possible to easily transfer music data desired by the user to the portable type storage reproduction apparatus PA desired by the user by employing a simple operation.

(4) Fourth Embodiment

Next, the fourth embodiment will be explained. In the fourth embodiment, the data storage reproduction apparatuses 11 and 111, and portable type storage reproduction apparatuses 12 and PA in the first to third embodiments are realized by hardware configuration.

Figure 19:
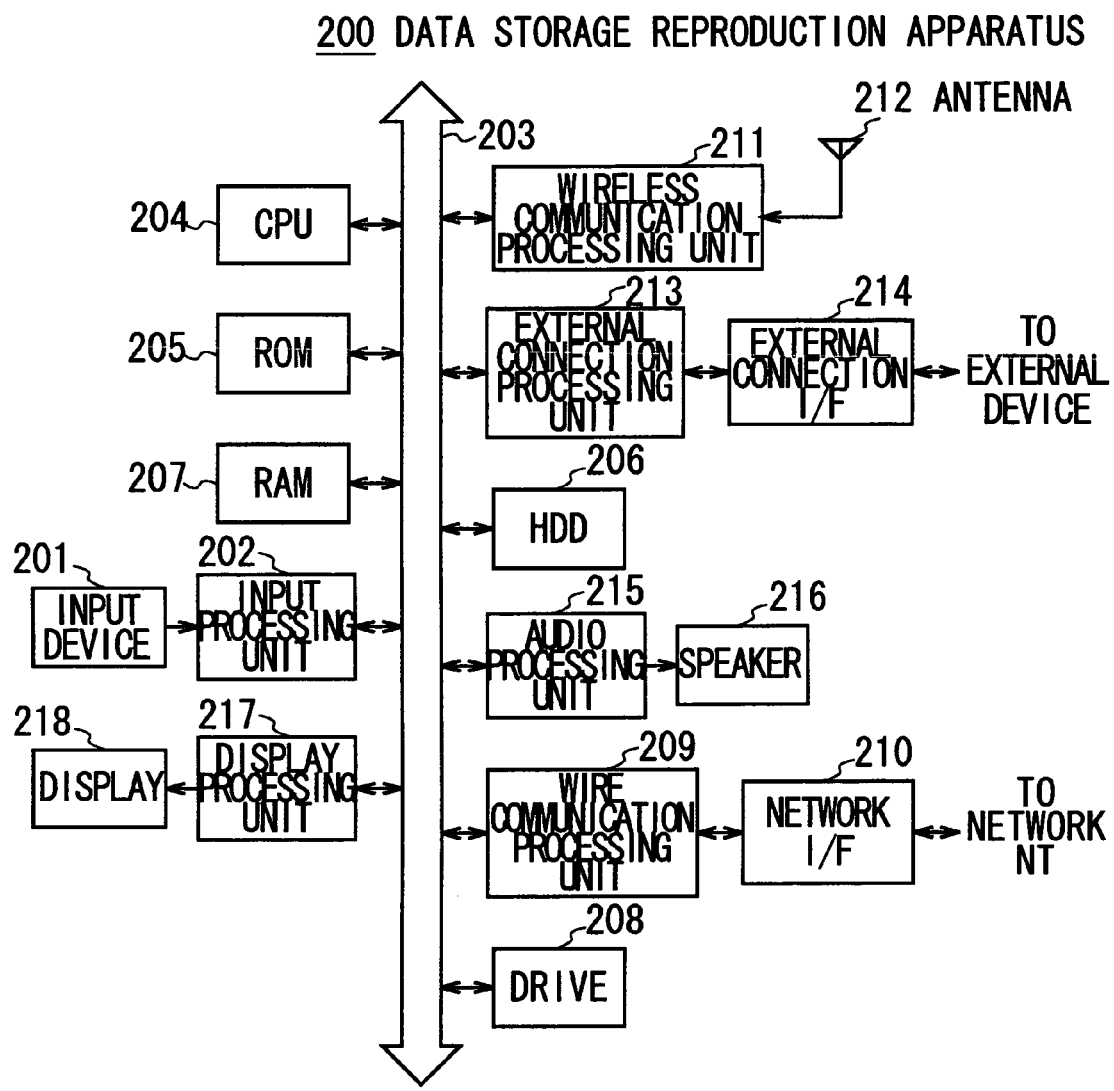
FIG. 19 shows a block diagram indicative of the hardware configuration of a data storage reproduction apparatus according to the fourth embodiment.

In a data storage reproduction apparatus 200 shown in FIG. 19, the functional configuration of the data storage reproduction apparatuses 11 and 111 in the first to third embodiments are realized by hardware configuration. When an input device 201 composed of a touch panel, a keyboard, a mouse, etc. is operated by the user, the input device 201 recognizes the operation, and sends an operation input signal corresponding to the operation to an input processing unit 202. The input processing unit 202 performs predetermined processing for thus supplied operation input signal to convert the operation input signal to an operation command, and sends the operation command to a Central Processing Unit (CPU) 204 through a bus 203.

The CPU 204 reads out various programs such as a basic program and an application program stored in a Read Only Memory (ROM) 205 or a hard disc drive 206 in advance to a Random Access Memory (RAM) 207 through the bus 203. Then, the CPU 204 controls the entire apparatus in accordance with these various programs expanded on the RAM 207, and executes predetermined arithmetic processing and various processing corresponding to an operation command sent from the input processing unit 202.

Specifically, for example, when an operation input signal that designates so that music data is ripped from a CD inserted to a drive 208 is input through the input device 201 by the user, the CPU 204 reads out music data from the CD inserted to the drive 208, and obtains ripping music data by performing ripping processing such as conversion processing of data format for the music data, and stores the ripping music data by storing it in a folder arbitrarily generated in the hard disc drive 206.

Furthermore, the CPU 204 is connected for communication with a server on a network NT through a wire communication processing unit 209 and a network interface 210 in series as necessary, and transmits and receives various data to and from the server.

Furthermore, the CPU 204 is connected for communication with an external device (for example, the portable type storage reproduction apparatus 12 or PA) by radio through a wireless communication processing unit 211 and an antenna 212 in series as necessary, and transmits and receives various data to and from the external device.

Furthermore, the CPU 204 is connected for communication with an external device (for example, the portable type storage reproduction apparatus 12 or PA) through an external connection processing unit 213 and an external connection interface 214 in series as necessary, and transmits and receives various data to and from the external device.

In this way, data (for example, music data) which is transmitted and received to and from other devices is stored when it is stored in an arbitrary folder in the hard disc drive 206, and is read out as necessary.

Furthermore, for example, when an operation input signal that designates so that music data stored in a folder of the hard disc drive 206 is reproduced is input through the input device 201 by the user, the CPU 204 reads out specified music data from the hard disc drive 206 through the input device 201, and sends thus read out music data to an audio processing unit 215 through the bus 203. The audio processing unit 215 performs the audio processing such as the decode processing, digital-to-analog conversion processing, and amplification processing for the music data, and sends thus obtained music signal to a speaker 216. As a result, the speaker 216 outputs music based on the music signal.

Furthermore, the CPU 204 reads out data for GUI screen from the hard disc drive 206 as necessary, and generates GUI screen data based on the data for GUI screen and the folder configuration of the hard disc drive 206, and sends thus generated GUI screen data to a display processing unit 217 through the bus 203. The display processing unit 217 displays a GUI screen in which a folder icon based on the GUI screen data is arranged on a display 218.

On the other hand, in the data storage reproduction apparatus 200, since the CPU 204 executes various processing in accordance with various programs stored in the ROM 205 or hard disc drive 206 in advance, according to various functions and processing to be executed of the data storage reproduction apparatus 11 (FIG. 3) of the functional configuration in the above-described first and second embodiments, by arbitrarily selecting various programs to be stored in the ROM 205 or hard disc drive 206, the CPU 204 can be made to function similarly as the control unit 20, command allocation unit 22, and detection unit 28 of the functional configuration, the input device 201 can be made to function similarly as the touch panel 14A of the functional configuration, the input processing unit 202 can be made to function similarly as the operation input unit 21 of the functional configuration, the hard disc drive 206 can be made to function similarly as the storage unit 24 of the functional configuration, the wire communication processing unit 209 and network interface 210 can be made to function similarly as the network connection unit 25A of the functional configuration, the external connection processing unit 213 and external connection interface 214 can be made to function similarly as the external connection unit 25B of the functional configuration, the CPU 204 and drive 208 can be made to function similarly as the CD ripping unit 23 of the functional configuration, the audio processing unit 215 can be made to function similarly as the reproduction unit 26 of the functional configuration, the speaker 216 can be made to function similarly as the output unit 27 of the functional configuration, and the display processing unit 217 and display 218 can be made to function similarly as the display unit 14B of the functional configuration.

Furthermore, similarly, in the data storage reproduction apparatus 200, according to various functions and processing to be executed of the data storage reproduction apparatus 111 (FIG. 14) of the functional configuration in the above-described third embodiment, by arbitrarily selecting various programs to be stored in the ROM 205 or hard disc drive 206, the CPU 204 can be made to function similarly as the control unit 120 and detection unit 127 of the functional configuration, the input device 201 can be made to function similarly as the operation unit 112 of the functional configuration, the input processing unit 202 can be made to function similarly as the operation input unit 121 of the functional configuration, the hard disc drive 206 can be made to function similarly as the storage unit 123 of the functional configuration, the wire communication processing unit 209 and network interface 210 can be made to function similarly as the network connection unit 124A of the functional configuration, the wireless communication processing unit 211 and antenna 212 can be made to function similarly as the radio communication unit 124B of the functional configuration, the CPU 204 and drive 208 can be made to function similarly as the CD ripping unit 122 of the functional configuration, the audio processing unit 215 can be made to function similarly as the reproduction unit 125 of the functional configuration, the speaker 216 can be made to function similarly as the output unit 126 of the functional configuration, and the display processing unit 217 and display 218 can be made to function similarly as the display unit 128 of the functional configuration.

Accordingly, in the data storage reproduction apparatus 200 in the fourth embodiment, by employing the hardware configuration shown in FIG. 19, various functions by the functional configuration in the first to third embodiments can be realized. Thus, effects similar to those in the first to third embodiments can be obtained.

The input device of the data storage reproduction apparatus 200 may be any one of a touch panel, a keyboard, and a mouse. Furthermore, the communication connection means of the data storage reproduction apparatus 200 may be any one of the wireless communication processing unit 211 and antenna 212, and external connection processing unit 213 and external connection interface 214.

Figure 20:
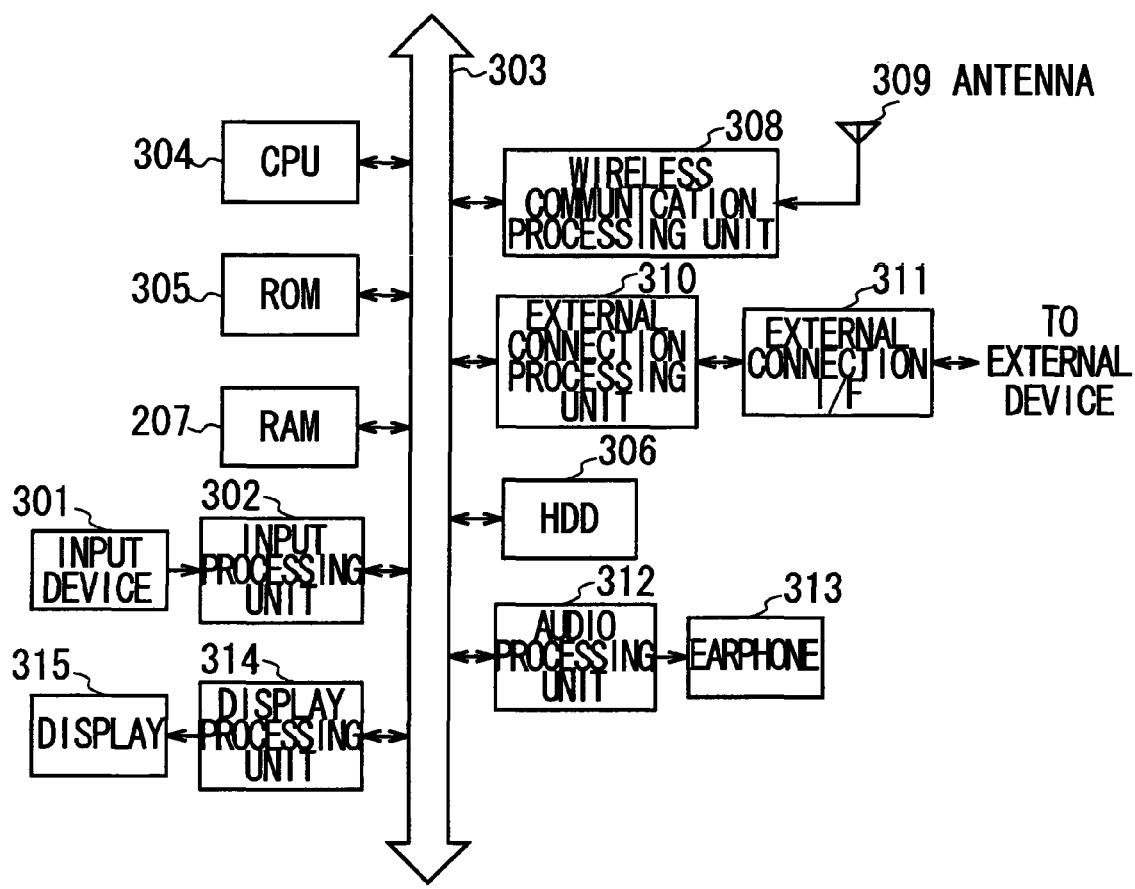
FIG. 20 shows a block diagram indicative of the hardware configuration of a portable type storage reproduction apparatus according to the fourth embodiment.

On the other hand, in a portable type storage reproduction apparatus 300 shown in FIG. 20, the functional configuration of the portable type storage reproduction apparatuses 12 and PA in the first to third embodiments are realized by hardware configuration. When an input device 301 composed of a key or a button is operated by the user, the input device 301 recognizes the operation, and sends an operation input signal corresponding to the operation to an input processing unit 302. The input processing unit 302 performs predetermined processing for thus supplied operation input signal to convert the operation input signal to an operation command, and sends the operation command to a CPU 304 through a bus 303.

The CPU 304 reads out various programs such as a basic program or an application program stored in a ROM 305 or a hard disc drive 306 in advance to a RAM 307 through the bus 303. Then, the CPU 304 controls the entire apparatus in accordance with the various programs expanded on the RAM 307, and executes predetermined arithmetic processing and various processing corresponding to an operation command sent from the input processing unit 302.

Specifically, the CPU 304 is connected for communication with an external device (for example, the data storage reproduction apparatus 11 or 111) by radio through a wireless communication processing unit 308 and an antenna 309 in series as necessary, and transmits and receives various data to and from the external device.

Furthermore, the CPU 304 is connected for communication with an external device (for example, the data storage reproduction apparatus 11 or 111) through an external connection processing unit 310 and an external connection interface 311 in series as necessary, and transmits and receives various data to and from the external device.

In this way, data (for example, music data) which is transmitted and received to and from the external device is stored in the hard disc drive 306, and is read out as necessary.

Furthermore, for example, when an operation input signal that designates so that music data stored in the hard disc drive 306 is reproduced is input through the input device 301 by the user, the CPU 304 reads out specified music data from the hard disc drive 306 through the input device 301, and sends thus read out music data to an audio processing unit 312 through the bus 303. The audio processing unit 312 performs the audio processing such as the decode processing, digital-to-analog conversion processing, and amplification processing for the music data, and sends thus obtained music signal to an earphone 313. As a result, the earphone 313 outputs music based on the music signal.

Furthermore, at this time, the CPU 304 reads out related information of music data which is designated to be reproduced from the hard disc drive 306, and sends thus read out related information to a display processing unit 314 through the bus 203. The display processing unit 314 displays tune name, artist name, reproduction elapse time, etc. based on the related information on a display 315.

On the other hand, in the portable type storage reproduction apparatus 300, since the CPU 304 executes various processing in accordance with various programs stored in the ROM 305 or hard disc drive 306 in advance, according to various functions and processing to be executed of the portable type storage reproduction apparatus 12 (FIG. 9) of the functional configuration in the above-described first and second embodiments, by arbitrarily selecting various programs to be stored in the ROM 305 or hard disc drive 306, the CPU 304 can be made to function similarly as the control unit 30 of the functional configuration, the input device 301 and input processing unit 302 can be made to function similarly as the operation unit 33 of the functional configuration, the hard disc drive 306 can be made to function similarly as the storage unit 32 of the functional configuration, the external connection processing unit 310 and external connection interface 311 can be made to function similarly as the external connection unit 31 of the functional configuration, the audio processing unit 312 can be made to function similarly as the reproduction unit 34 of the functional configuration, the earphone 313 can be made to function similarly as the output unit 35 of the functional configuration, and the display processing unit 314 and display 315 can be made to function similarly as the display unit 36 of the functional configuration.

Furthermore, similarly, in the portable type storage reproduction apparatus 300, according to various functions and processing to be executed of the portable type storage reproduction apparatus PA (FIG. 17) of the functional configuration in the above-described third embodiment, by arbitrarily selecting various programs to be stored in the ROM 305 or hard disc drive 306, the CPU 304 can be made to function similarly as the control unit 130 of the functional configuration, the input device 301 and input processing unit 302 can be made to function similarly as the operation unit 133 of the functional configuration, the hard disc drive 306 can be made to function similarly as the storage unit 132 of the functional configuration, the wireless communication processing unit 308 and antenna 309 can be made to function similarly as the radio communication unit 131 of the functional configuration, the audio processing unit 312 can be made to function similarly as the reproduction unit 134 of the functional configuration, the earphone 313 can be made to function similarly as the output unit 135 of the functional configuration, and the display processing unit 314 and display 315 can be made to function similarly as the display unit 136 of the functional configuration.

Accordingly, in the portable type storage reproduction apparatus 300 in the fourth embodiment, by employing the hardware configuration shown in FIG. 20, various functions by the functional configuration in the first to third embodiments can be realized. Thus, effects similar to those in the first to third embodiments can be obtained.

On the other hand, the communication connection means of the portable type storage reproduction apparatus 300 may be any one of the wireless communication processing unit 308 and antenna 309, and external connection processing unit 310 and external connection interface 311.

In the fourth embodiment, the CPU 204 of the data storage reproduction apparatus 200 executes various processing in accordance with various programs stored in the ROM 205 or hard disc drive 206 in advance, to which the present invention is not restricted, and there may be employed a configuration in which various programs have been recorded in a recording medium such as a Compact Disc (CD) or a Digital Versatile Disc (DVD), and the CPU 204 executes various processing in accordance with the various programs read out from the recording medium by the drive 208, or various programs may be installed to the hard disc drive 206 from the recording medium to be executed.

As for the portable type storage reproduction apparatus 300, similarly, there may be employed a configuration in which various programs have been recorded in a recording medium such as a CD or a DVD, and the CPU 303 executes various processing in accordance with the various programs read out from the recording medium, or various programs may be installed to the hard disc drive 306 from the recording medium to be executed.

(5) Other Embodiments

In the above-described first embodiment, when the data storage reproduction apparatus 11 is connected for communication with the portable type storage reproduction apparatus 12, with respect to an operation of one-clicking the folder icon Fi, a command of transferring music data stored in a folder corresponding to the folder icon Fi to the portable type storage reproduction apparatus 12 is allocated, to which the present invention is not restricted, and, with respect to an operation of one-clicking the folder icon Fi, a command of transferring music data stored in a folder corresponding to the folder icon Fi to the portable type storage reproduction apparatus 12, and receiving predetermined music data (for example, music data which is not stored in the folder) from the portable type storage reproduction apparatus 12 to store thus received music data in the folder may be allocated.

Figure 21:
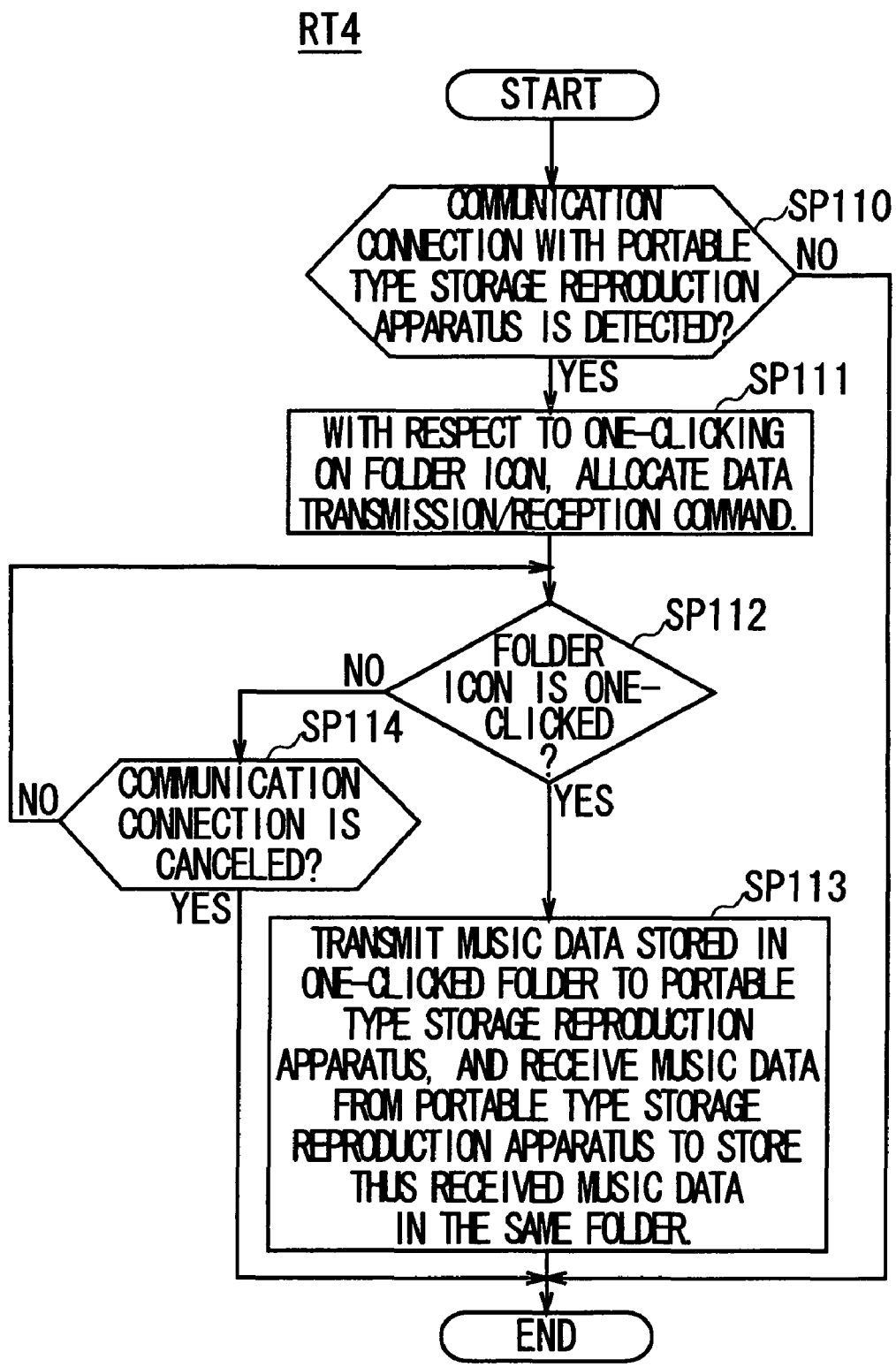
FIG. 21 shows a flowchart indicative of the data transmission/reception processing procedure in another embodiment.

Next, the data transmission/reception processing procedure in this case will be explained using a flowchart shown in FIG. 21. The data transmission/reception processing procedure is the procedure of processing to be executed mainly by the control unit 20, command allocation unit 22, and detection unit 28 of the data storage reproduction apparatus 11.

For example, when power is on, in step SP110 of the data transmission/reception processing procedure RT4, the detection unit 28 of the data storage reproduction apparatus 11 detects whether or not the data storage reproduction apparatus 11 is connected for communication with the portable type storage reproduction apparatus 12 through the communication cable 13 from the external connection unit 25B. In case the negative result is obtained in step SP110, this represents that the data storage reproduction apparatus 11 is not connected for communication with the portable type storage reproduction apparatus 12, and the detection unit 28 ends the data transmission/reception processing procedure RT4.

On the other hand, in case the positive result is obtained in step SP110, this represents that the data storage reproduction apparatus 11 is connected for communication with the portable type storage reproduction apparatus 12, and the detection unit 28 notifies the command allocation unit 22 of this state.

When receiving the notification that the data storage reproduction apparatus 11 is connected for communication with the portable type storage reproduction apparatus 12 from the detection unit 28, in the following step SP111, with respect to an operation input of one-clicking the folder icon Fi arranged on the GUI screen Gw, the command allocation unit 22 allocates a command of transferring music data stored in a folder corresponding to the folder icon Fi to the portable type storage reproduction apparatus 12, and receiving predetermined music data (for example, music data which is not stored in the folder) from the portable type storage reproduction apparatus 12 to store thus received music data in the folder.

When allocating the command is completed by the command allocation unit 22, in the following step SP112, the control unit 20 determines whether or not the folder icon Fi is one-clicked through the touch panel 14A based on an operation input sent from the operation input unit 21.

In case the positive result is obtained in step SP112, this represents that the folder icon Fi is one-clicked by the user, and the control unit 20 goes to step SP113. In step SP113, the control unit 20 reads out music data stored in a folder corresponding to the one-clicked folder icon Fi from the storage unit 24, and transfers thus read out music data to the portable type storage reproduction apparatus 12 from the external connection unit 25B, and receives predetermined music data (for example, music data which is not stored in the folder) from the portable type storage reproduction apparatus 12 through the external connection unit 25B to store thus received music data in the folder, ending the data transmission/reception processing procedure RT4.

On the other hand, in case the negative result is obtained in the above-described step SP112, this represents that the folder icon Fi has not been one-clicked yet, and the control unit 20 goes to step SP114. In step SP114, the control unit 20 determines whether or not notification that the communication connection between the data storage reproduction apparatus 11 and the portable type storage reproduction apparatus 12 is canceled is received from the detection unit 28.

In case the negative result is obtained in step SP114, this represents that the data storage reproduction apparatus 11 and the portable type storage reproduction apparatus 12 are still connected for communication, and then the control unit 20 returns to step SP112 again, and waits for the folder icon Fi to be one-clicked.

On the other hand, in case the positive result is obtained in step SP114, this represents that the communication connection between the data storage reproduction apparatus 11 and the portable type storage reproduction apparatus 12 is canceled, and then the control unit 20 ends the data transmission/reception processing procedure RT4.

In accordance with the data transmission/reception processing procedure RT4, the data storage reproduction apparatus 11 transmits/receives music data to and from the portable type storage reproduction apparatus 12.

In this way, when the data storage reproduction apparatus 11 is connected for communication with the portable type storage reproduction apparatus 12, by only making the user one-click the arbitrary folder icon Fi, music data stored in a folder corresponding to the folder icon Fi can be transferred to the portable type storage reproduction apparatus 12, and predetermined music data can be received from the portable type storage reproduction apparatus 12 to be stored in the folder.

Accordingly, for example, when music data which is not stored in a folder corresponding to the one-clicked folder icon Fi is received from the portable type storage reproduction apparatus 12, by only making the user one-click the arbitrary folder icon Fi, the music data stored in the folder and the music data stored in the storage unit 32 of the portable type storage reproduction apparatus 12 can be made identical (that is, synchronization can be obtained).

Furthermore, the embodiment is not restricted to this, and there may be employed a configuration in which, with respect to an operation of one-clicking the folder icon Fi at the time of connection, a command of transferring music data stored in a folder corresponding to the folder icon Fi to the portable type storage reproduction apparatus 12 is allocated, and with respect to an operation of double-clicking the folder icon Fi at the time of connection, a command of receiving predetermined music data (for example, music data which is not stored in the folder) from the portable type storage reproduction apparatus 12 and storing thus received music data in the folder is allocated, and these plural commands, one-click operation, and double-click operation may be arbitrarily combined.

Furthermore, there may be employed a configuration in which an operation unit (for example, a mouse) having at least two buttons is arranged on the data storage reproduction apparatus 11 instead of the touch panel 14A, and a command which is allocated to the one-click operation through the touch panel 14A is allocated to the one-click operation for one button (for example, the left button of the mouse) of the operation unit, while a command which is allocated to the double-click operation through the touch panel 14A is allocated to the one-click operation for the other button (for example, the right button of the mouse) of the operation unit. In this way, being restricted to an operation unit having at least two or more buttons such as a mouse, inputting the above-described plural commands can be realized by performing only the one-click operation for different buttons.

Furthermore, in the above-described first to third embodiments, by employing the touch panel 14A, or the operation unit 112 being a keyboard and a mouse, a predetermined operation is performed by the user, to which the present invention is not restricted, and there may be employed a configuration in which an operation unit (for example, a touch pad) other than these is arranged on the data storage reproduction apparatuses 11 and 111, and the user is made to perform a predetermined operation using the operation unit.

Furthermore, in the above-described first to second embodiments, when the data storage reproduction apparatus 11 is connected for communication with the portable type storage reproduction apparatus 12, when the arbitrary folder icon Fi is one-clicked, music data stored in a folder corresponding to the folder icon Fi is transferred to the portable type storage reproduction apparatus 12 without condition, to which the present invention is not restricted, and there may be employed a configuration in which, for example, the control unit 20 of the data storage reproduction apparatus 11 determines whether or not respective music data stored in a folder can be transferred to the portable type storage reproduction apparatus 12, and only music data which can be transferred based on the determination is transferred.

Music data which is unable to be transferred is, for example, music data to which information (also referred to as entitlement information) that permits reproduction only by the data storage reproduction apparatus 11 is attached, and, with respect to the music data, by not transferring the music data to the portable type storage reproduction apparatus 12, the music data can be prevented from being unfairly used.

On the other hand, with respect to music data to which entitlement information that permits reproduction only by the data storage reproduction apparatus 11 is attached (that is, music data which is not permitted to be transferred to the portable type storage reproduction apparatus 12), for example, by inquiring a music delivery server, not shown, on a network NT to obtain entitlement information that permits reproduction (that is, permits transfer) by the portable type storage reproduction apparatus 12, after obtaining the permission to transfer the music data, the control unit 20 may transfer the music data to the portable type storage reproduction apparatus 12. On the other hand, in case the accounting occurs when obtaining the entitlement information that permits reproduction by the portable type storage reproduction apparatus 12, the control unit 20 may perform the accounting processing with a music delivery server on a network NT.

In this way, music data can be prevented from being unfairly used, and music data desired by the user can be surely transferred to the portable type storage reproduction apparatus 12.

Furthermore, in the above-described third embodiment, among one or more portable type storage reproduction apparatuses PA which are connected for communication by radio with the data storage reproduction apparatus 111, music data is transferred to one portable type storage reproduction apparatus PA closest to the data storage reproduction apparatus 111, to which the present invention is not restricted, and, among one or more portable type storage reproduction apparatuses PA which are connected for communication by radio with the data storage reproduction apparatus 111, when there exists one portable type storage reproduction apparatus PA which transmits a signal indicating that music data is to be transferred thereto, priority may be given to this portable type storage reproduction apparatus PA to transfer music data to this portable type storage reproduction apparatus PA.

In this case, for example, when a predetermined button of the operation unit 112 is pressed by the user, the portable type storage reproduction apparatus PA transmits a signal indicating that music data is to be transferred thereto to the data storage reproduction apparatus 111.

In this way, desired music data can be surely transferred to the desired portable type storage reproduction apparatus PA.

In the above-described first to third embodiments, as a symbol corresponding to a data storage place, the folder icon Fi in the form of a folder is displayed, to which the present invention is not restricted, and an icon, a button, an object in the form of other various figurations may be used so long as these are symbols corresponding to a data storage place.

Furthermore, in the above-described first to fourth embodiments, the present invention is applied to the data storage reproduction apparatuses 11, 111, and 200 having a display unit (touch-panel-attached display unit 14, display unit 128, display 218), to which the present invention is not restricted, and the present invention may be applied to a data storage reproduction apparatus which does not have a display unit, and is externally connected to a display unit through a predetermined cable.

Furthermore, in the above-described first to fourth embodiments, the present invention is applied to a case in which music data is transmitted or transmitted/received between the data storage reproduction apparatuses 11, 111, 200 and the portable type storage reproduction apparatuses 12, PA, 300, to which the present invention is not restricted, and the present invention may be applied to a case in which music data is transmitted or transmitted/received between the data storage reproduction apparatus 11 and the data storage reproduction apparatus 11, or a case in which, for example, by providing the portable type storage reproduction apparatus 12 with a function similar to that of the data storage reproduction apparatus 11, music data is transmitted or transmitted/received between the portable type storage reproduction apparatus 12 and the portable type storage reproduction apparatus 12.

The present invention is not restricted to the above-described first to fourth embodiments and other embodiments which has been described here, and may be applied to a configuration which arbitrarily combines part or entirety of the first to fourth embodiments and other embodiments which has been described here, or may be applied to a configuration which arbitrarily extracts part thereof. For example, the communication connection in the first embodiment may be replaced with the communication connection by radio in the third embodiment, the communication connection in the second embodiment may be replaced with the communication connection by radio in the third embodiment, the operation input in the third embodiment may be replaced with the operation input in the first embodiment, the command allocation in the third embodiment may be replaced with the command allocation in the second embodiment, and the change in the display figuration of the folder icon Fi in the first embodiment may be combined to the third embodiment.

Furthermore, in the above-described first to fourth embodiments and other embodiments which has been described here, the present invention is applied to the data storage reproduction apparatuses 11, 111, and 200 which transmit or transmit/receive music data as data, to which the present invention is not restricted, and the present invention can be applied to an apparatus which transmits or transmits/receives other various data other than music data such as audio data, image data, program data, and, specifically, widely applied to an apparatus which processes other various data, or a personal computer, an audio component, a DVD recorder, a hard disc recorder, etc.

The present invention can be widely utilized for an apparatus which transfers data.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    a communication unit that transmits/receives data to and from an external device;
    a detection unit that detects communication connection with the external device by the communication unit;
    an operation input unit that accepts an operation input;
    a command allocation unit that, only when the detection unit detects communication connection with the external device, allocates a data transmission command with respect to a one-click operation to a symbol corresponding to a data storage place of the apparatus to be displayed on a display unit, which is accepted by the operation input unit, wherein, when communication connection with the external device is not detected by the detection unit, a data transmission command with respect to the one-click operation is not allocated by the command allocation unit to the symbol corresponding to the data storage place of the apparatus to be displayed on the display unit; and
    a control unit that, when the operation input unit accepts the one-click operation to the symbol, in case the data transmission command is allocated with respect to the one-click operation, controls so that the communication unit transmits data stored in the data storage place corresponding to the symbol to the external device.

2. The information processing apparatus according to claim 1, wherein
    the control unit changes the display figuration of the symbol to be displayed on the display unit according to whether or not communication connection with the external device is detected by the detection unit.

3. The information processing apparatus according to claim 1, wherein
    the communication unit starts communication connection with the external device when the external device comes close thereto.

4. The information processing apparatus according to claim 1, wherein
    the operation input unit accepts an operation input from a touch panel.

5. The information processing apparatus according to claim 1, wherein
    plural data is stored in the data storage place.

6. The information processing apparatus according to claim 1, wherein
    the operation input unit accepts an operation input when the display unit is touched.

7. The information processing apparatus according to claim 1, wherein
    when the detection unit detects communication connection with the external device, the command allocation unit allocates a data transmission command and a data reception command with respect to the one-click operation to the symbol, and
    in case the operation input unit accepts the one-click operation to the symbol, when the data transmission command and data reception command are allocated to the one-click operation, the control unit controls the communication unit to transmit data stored in the data storage place corresponding to the symbol to the external device, and receive data from the external device to store thus received data in the data storage place corresponding to the symbol.

8. The information processing apparatus according to claim 1, wherein
when the detection unit detects communication connection with the external device, the command allocation unit allocates a data reception command with respect to a two-click operation to the symbol, and
in case the operation input unit accepts the two-click operation to the symbol, when the data reception command is allocated to the two-click operation, the control unit controls the communication unit to receive data from the external device to store thus received data in the data storage place corresponding to the symbol.

9. The information processing apparatus according to claim 1, wherein
in case the operation input unit accepts the one-click operation to the symbol, when the data transmission command is allocated to the one-click operation, the control unit determines whether or not data stored in the data storage place corresponding to the symbol can be transmitted to the external device, and controls the communication unit so that only data which can be transmitted based on the determination is transmitted to the external device.

10. An information processing method comprising:
a detection step of detecting communication connection with an external device;
a command allocation step of, only when communication connection with the external device is detected in the detection step, allocating a data transmission command with respect to a one-click operation to a symbol corresponding to a data storage place of other than the external device to be displayed on a display unit, which is accepted by an operation input unit, and, when communication connection with the external device is not detected in the detection step, a data transmission command with respect to the one-click operation is not allocated to the symbol corresponding to the data storage place of other than the external device to be displayed on the display unit; and
a transmission step of, when the operation input unit accepts the one-click operation to the symbol, in case the data transmission command is allocated with respect to the one-click operation, transmitting data stored in the data storage place corresponding to the symbol to the external device.

11. An information processing program that makes an information processing apparatus execute the steps comprising:
a detection step of detecting communication connection between a communication unit and an external device;
a command allocation step of, only when communication connection with the external device is detected in the detection step, allocating a data transmission command with respect to a one-click operation to a symbol corresponding to a data storage place of the apparatus to be displayed on a display unit, which is accepted by an operation input unit, and, when communication connection with the external device is not detected in the detection step, a data transmission command with respect to the one-click operation is not allocated to the symbol corresponding to the data storage place of the apparatus to be displayed on the display unit; and
a transmission step of, when the operation input unit accepts the one-click operation to the symbol, in case the data transmission command is allocated with respect to the one-click operation, transmitting data stored in the data storage place corresponding to the symbol to the external device from the communication unit.

* * * * *